US012496036B2

(12) United States Patent
Boutelle et al.

(10) Patent No.: US 12,496,036 B2
(45) Date of Patent: Dec. 16, 2025

(54) PHYSIOLOGY SENSING INTRALUMINAL DEVICE WITH POSITIONING GUIDANCE AND ASSOCIATED DEVICES, SYSTEMS, AND METHODS

(71) Applicant: PHILIPS IMAGE GUIDED THERAPY CORPORATION, San Diego, CA (US)

(72) Inventors: Meredith Boutelle, Encinitas, CA (US); Stephen Charles Davies, El Dorado Hills, CA (US); Albert Hendrik Jan Immink, Eindhoven (NL); Suresh Narayanan, San Marcos, CA (US)

(73) Assignee: PHILIPS IMAGE GUIDED THERAPY CORPORATION, San Diego, CA (US)

( * ) Notice: Subject to any disclaimer, the term of this patent is extended or adjusted under 35 U.S.C. 154(b) by 179 days.

(21) Appl. No.: 18/094,468

(22) Filed: Jan. 9, 2023

(65) Prior Publication Data

US 2023/0218262 A1 Jul. 13, 2023

Related U.S. Application Data

(60) Provisional application No. 63/297,703, filed on Jan. 8, 2022.

(30) Foreign Application Priority Data

Apr. 21, 2022 (EP) ..................... 22169140

(51) Int. Cl.
*A61B 8/06* (2006.01)
*A61B 8/00* (2006.01)
(Continued)

(52) U.S. Cl.
CPC .................. *A61B 8/06* (2013.01); *A61B 8/12* (2013.01); *A61B 8/485* (2013.01); *A61B 8/488* (2013.01);
(Continued)

(58) Field of Classification Search
CPC ... A61B 2034/2063; A61B 34/20; A61B 8/02; A61B 8/06; A61B 8/0891; A61B 8/12;
(Continued)

(56) References Cited

U.S. PATENT DOCUMENTS 5,339,816 A 8/1994 Akamatsu
6,041,662 A 3/2000 Jenni
(Continued)

OTHER PUBLICATIONS

Kaufmann, Philipp A. et al "Novel Doppler Assessment of Intracoronary Volumetric Flow Reserve: Validation Against PET in Patients With or Without Flow-Dependent Vasodilation", The Journal of Nuclear Medicine, vol. 46, No. 8, Aug. 2005; pp. 1272-1277.
Yeung, King-Wah W. "Angle-Insensitive Flow Measurement using Doppler Bandwidth", IEEE Transactions on Ultrasonics, Ferroelectrics, and Frequency Control, vol. 45, No. 3, May 1998.

*Primary Examiner* — Michael T Rozanski

(57) ABSTRACT

An intraluminal sensing system is provided that includes an intraluminal device. The intraluminal device has a flexible elongate member configured to be positioned within a body lumen of a patient, and an ultrasound sensor at a distal portion of the flexible elongate member. The ultrasound sensor is configured to emit an ultrasound pulse in a longitudinal within the body lumen, and to receive Doppler-shifted echoes from the ultrasound pulse. A processor circuit in communication with the ultrasound sensor is configured to: compute a velocity spectrum of particles moving within the body lumen based on the Doppler-shifted echoes; identify features in the velocity spectrum indicative of a lateral position or angular alignment of the ultrasound sensor within the body lumen; and output, to a display in commu-
(Continued)

nication with the processor circuit, positioning guidance for the intraluminal device based on the identified features in the velocity spectrum.

23 Claims, 24 Drawing Sheets

(51) Int. Cl.
    *A61B 8/08*          (2006.01)
    *A61B 8/12*          (2006.01)
    *A61B 34/20*        (2016.01)

(52) U.S. Cl.
    CPC ...... *A61B 34/20* (2016.02); *A61B 2034/2063* (2016.02)

(58) Field of Classification Search
    CPC ..... A61B 8/145; A61B 8/4245; A61B 8/4477; A61B 8/463; A61B 8/467; A61B 8/485; A61B 8/488; A61B 8/5207; A61B 8/5223
    See application file for complete search history.

(56) References Cited

U.S. PATENT DOCUMENTS

| | | |
|---|---|---|
| 2020/0022676 A1 | 1/2020 | Hendriks |
| 2022/0111181 A1* | 4/2022 | Hebert .............. A61M 25/0097 |

* cited by examiner es to devices and methods for improving sensor positioning and measurement quality for physiology sensing intraluminal devices. This intraluminal measurement system has particular but not exclusive utility for intravascular catheters and guidewires.

PHYSIOLOGY SENSING INTRALUMINAL DEVICE WITH POSITIONING GUIDANCE AND ASSOCIATED DEVICES, SYSTEMS, AND METHODS

CROSS-REFERENCE TO RELATED APPLICATIONS

This application claims priority to and benefit of U.S. Provisional Application No. 63/297,703, filed Jan. 8, 2022. This application also claims priority to European Application No. 22169140.5, filed Apr. 21, 2022. Each of these applications is hereby incorporated by reference in its entirety.

TECHNICAL FIELD

The subject matter described herein relates to devices and methods for improving sensor positioning and measurement quality for physiology sensing intraluminal devices. This intraluminal measurement system has particular but not exclusive utility for intravascular catheters and guidewires.

BACKGROUND

Coronary artery disease (CAD) is among the world's leading causes of death. To address this problem, image guided therapy (IGT) makes use of a wide variety of imaging modalities (e.g., coronary angiography) as well as in-body diagnostic devices (e.g. pressure-sensing guidewires or intravascular ultrasound catheters). Small-diameter medical devices such as intraluminal (e.g., intravascular) catheters and guidewires may incorporate sensors (e.g., pressure, temperature, flow, or imaging sensors) whose power and communications occur through electrical conductor bundles. However, existing intravascular systems for measuring blood flow parameters may in some cases be burdensome to learn and use. Such burdens may for example apply to interventional cardiologists who perform intravascular flow measurements to diagnose microvascular disease with Doppler sensor positioning and signal optimization. Limitations of the current technology limit the usability of current systems, which may ultimately contribute to physician frustration and lack of adoption. It may also extend overall procedure duration, which increases the costs of care.

The information included in this Background section of the specification, including any references cited herein and any description or discussion thereof, is included for technical reference purposes only and is not to be regarded as subject matter by which the scope of the disclosure is to be bound.

SUMMARY

A blood flow velocity sensing guidewire can be used for example to assess Non-Obstructive Coronary Artery Disease (NOCAD) and MicroVascular Disease (MVD). The present disclosure adds novel capabilities to such flow sensing systems, including the ability to provide clear and unambiguous guidance to the user on correct positioning and orientation of the guidewire, the ability to automatically select the high quality measurement portions (samples) from a series of measurements at different (random, semi-random, or systematic) guidewire positions, and discard all other signals, and the ability to correct the measurement result for any sub-optimal guidewire positioning. Such methods may be useful in blood flow velocity measurements, blood flow measurements, Doppler ultrasound measurements, positioning, and signal optimization. The flow sensing systems, devices, and methods described herein have particular, but not exclusive, utility for intraluminal medical catheters and guidewires.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes an intraluminal sensing system that includes an intraluminal device including: a flexible elongate member configured to be positioned in a longitudinal direction within a body lumen of a patient, and an ultrasound sensor disposed at a distal portion of the flexible elongate member and configured to emit an ultrasound pulse in substantially the longitudinal direction while positioned within the body lumen and to receive doppler-shifted echoes from the ultrasound pulse. The intraluminal sensing system also includes a processor circuit in communication with the ultrasound sensor and configured to: compute a velocity spectrum of particles moving within the body lumen based on the received doppler-shifted echoes; identify features in the velocity spectrum indicative of at least one of a lateral position or angular alignment of the ultrasound sensor within the body lumen; and output, to a display in communication with the processor circuit, positioning guidance for the intraluminal device based on the identified features in the velocity spectrum. Other embodiments of this aspect include corresponding computer systems, apparatus, and computer programs recorded on one or more computer storage devices, each configured to perform the actions of the methods.

Implementations may include one or more of the following features. In some embodiments, the processor circuit is further configured to determine whether the lateral position or angular alignment falls within a pre-determined range indicative of a signal quality of the received doppler-shifted echoes. In some embodiments, the processor circuit is further configured to, based on whether the lateral position or angular alignment falls within the pre-determined range: determine whether to calculate a flow parameter from the velocity spectrum; and calculate the flow parameter from the velocity spectrum. In some embodiments, the processor circuit is further configured to, based on second doppler echoes received from a second ultrasound pulse emitted by ultrasound sensor: compute a second velocity spectrum of particles moving within the body lumen; and identify features in the second velocity spectrum indicative of a second lateral position or angular alignment of the ultrasound sensor within the body lumen; and based on a comparison between the lateral position or angular alignment and the second lateral position or angular alignment, determine whether to recalculate the flow parameter from the second velocity spectrum. In some embodiments, the processor circuit is further configured to, based on whether the lateral position or angular alignment falls within a pre-determined range, issue instructions to a user or operator of the intraluminal sensing system to alter the lateral position or angular alignment. In some embodiments, the instructions include text or graphics. In some embodiments, identifying the features in the velocity spectrum includes pattern matching, lookup tables, a learning network, or a geometric transformation. In some embodiments, the processor circuit is further configured to adjust the velocity spectrum based on the identified features in the velocity spectrum. In some embodiments, the adjusting includes pattern matching, lookup tables, a learning network, or a geometric transformation. In some embodiments, the ultrasound sensor is further configured to emit an ultrasound shear wave in a direction substantially perpendicular to the longitudinal direction while positioned within the body lumen and to receive second doppler-shifted echoes from the shear wave; and where the processor circuit is further configured to compute the velocity spectrum based on the doppler-shifted echoes and the second doppler-shifted echoes. In some embodiments, the processor circuit is further configured to compute the velocity spectrum based on the doppler-shifted echoes and the second doppler-shifted echoes. In some embodiments, the processor circuit is further configured to: based on the received doppler-shifted echoes, compute a first velocity spectrum at a first measurement depth; based on the received doppler-shifted echoes, compute a second velocity spectrum at a second measuring depth; and identify features in the first velocity spectrum and the second velocity spectrum indicative of a second lateral position or angular alignment of the ultrasound sensor within the body lumen. Implementations of the described techniques may include hardware, a method or process, or computer software on a computer-accessible medium.

One general aspect includes a method for intraluminal sensing. The method includes, with an ultrasound sensor disposed at a distal portion of a flexible elongate member positioned within a body lumen of a patient: emitting an ultrasound pulse in a substantially longitudinal direction, and receiving doppler-shifted echoes from the ultrasound pulse. The method also includes, with a processor circuit in communication with the ultrasound sensor: computing a velocity spectrum of particles moving within the body lumen, based on the received doppler-shifted echoes; and identifying features in the velocity spectrum indicative of a lateral position or angular alignment of the ultrasound sensor within the body lumen; and outputting, to a display in communication with the processor circuit, positioning guidance for the ultrasound sensor based on the identified features in the velocity spectrum. Other embodiments of this aspect include corresponding computer systems, apparatus, and computer programs recorded on one or more computer storage devices, each configured to perform the actions of the methods.

Implementations may include one or more of the following features. In some embodiments, the method further includes, with the processor circuit: determining whether the lateral position or angular alignment falls within a pre-determined range indicative of a signal quality of the received doppler-shifted echoes; based on whether the lateral position or angular alignment falls within the pre-determined range, calculating a flow parameter from the velocity spectrum; and based on whether the lateral position or angular alignment falls within the pre-determined range, issuing instructions to a user or operator of the intraluminal sensing system to alter the lateral position or angular alignment. In some embodiments, the method further includes, with the processor circuit: based on second doppler echoes received from a second ultrasound pulse emitted by the ultrasound sensor: computing a second velocity spectrum of particles moving within the body lumen; and identifying features in the second velocity spectrum indicative of a second lateral position or angular alignment of the ultrasound sensor within the body lumen; based on the identified features, determining whether the lateral position or angular alignment falls within a pre-determined range indicative of a signal quality of the received doppler-shifted echoes; based on whether the lateral position or angular alignment falls within the pre-determined range, determining whether to calculate the flow parameter from the velocity spectrum; based on whether the lateral position or angular alignment falls within the pre-determined range, issuing instructions to a user or operator of the intraluminal sensing system to alter the lateral position or angular alignment; and calculating the flow parameter from the second velocity spectrum. In some embodiments, the method further includes adjusting the velocity spectrum based on the identified features in the velocity spectrum. In some embodiments, the method further includes: with the ultrasound sensor, emitting an ultrasound shear wave in a direction substantially perpendicular to the longitudinal direction while positioned within the body lumen and to receive second doppler-shifted echoes from the shear wave; and computing the velocity spectrum based on the doppler-shifted echoes and the second doppler-shifted echoes. In some embodiments, the method further includes: with a second sensing element disposed at the distal portion of the flexible elongate member: emitting a second ultrasound pulse substantially orthogonal to the longitudinal direction; receiving second doppler-shifted echoes from the second ultrasound pulse; and with the processor circuit, computing the velocity spectrum based on the doppler-shifted echoes and the second doppler-shifted echoes. In some embodiments, the method further includes, with the processor circuit: based on the received doppler-shifted echoes, computing a first velocity spectrum at a first measurement depth; based on the received doppler-shifted echoes, computing a second velocity spectrum at a second measuring depth; and identifying features in the first velocity spectrum and the second velocity spectrum indicative of a second lateral position or angular alignment of the ultrasound sensor within the body lumen. Implementations of the described techniques may include hardware, a method or process, or computer software on a computer-accessible medium.

One general aspect includes an intraluminal sensing system which includes a sensing guidewire including: a flexible elongate member configured to be positioned within a blood vessel of a patient, and an intravascular ultrasound sensor disposed at a distal portion of the flexible elongate member and configured to emit an ultrasound pulse in a longitudinal direction within the blood vessel and to receive doppler-shifted echoes from the ultrasound pulse. The intraluminal sensing system also includes a processor circuit in communication with the intravascular ultrasound sensor and configured to: based on the received doppler-shifted echoes, compute a velocity spectrum of particles moving within the blood vessel; identify features in the velocity spectrum indicative of a lateral position or angular alignment of the intravascular ultrasound sensor within the blood vessel; determine whether the lateral position or angular alignment falls within a pre-determined range indicative of a signal quality of the received doppler-shifted echoes; output, to a display in communication with the processor circuit, positioning guidance for the intravascular ultrasound sensor based on the identified features in the velocity spectrum; based on whether the lateral position or angular alignment falls within the pre-determined range, issue instructions to a user or operator of the intraluminal sensing system to alter the lateral position or angular alignment; and calculate a flow parameter from the velocity spectrum. Other embodiments of this aspect include corresponding computer systems, apparatus, and computer programs recorded on one or more computer storage devices, each configured to perform the actions of the methods.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the flow measurement system, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

Figure 1:
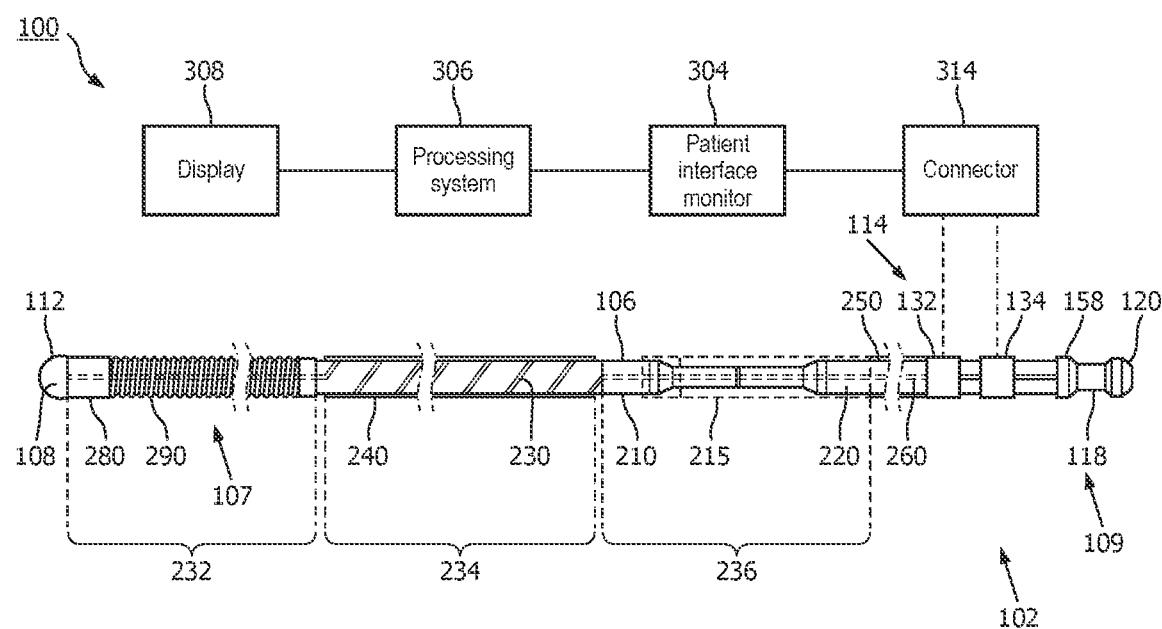
FIG. 1 is a diagrammatic side view of an intravascular sensing system that includes an intravascular device comprising an a multi-filar electrical conductor bundle, according to aspects of the present disclosure.

Coronary artery disease (CAD) is among the world's leading causes of death. To address this problem, Philips Image Guided Therapy (IGT) has a strong portfolio in imaging systems (for e.g. coronary angiography) as well as in-body diagnostic devices (e.g. pressure-sensing guidewires or intravascular ultrasound catheters). One such diagnostic device is the blood flow velocity sensing guidewire, which can be used for example to assess Non-Obstructive Coronary Artery Disease (NOCAD) and Micro-Vascular Disease (MVD). These guidewires are equipped with a single-element ultrasound transducer that is located at its tip. The transducer can emit ultrasound waves in a forward-looking direction and receive the corresponding pulse-echo signals. By pulsed-wave (PW) Doppler analysis, the blood velocity distribution in a specific sampling volume can be deduced. An algorithm for signal optimization that incorporates vessel wall Doppler harmonics enables users to acquire highly accurate and reproducible beat-to-beat absolute flow and myocardial mass measurements, ensuring a correct diagnosis.

The present disclosure adds novel capabilities to such flow sensing systems, including the ability to provide clear and unambiguous guidance to the user on correct positioning and orientation of the guidewire, the ability to automatically select the high quality measurement portions (samples) from a series of measurements at different (random, semi-random, or systematic) guidewire positions, and discard all other signals, and the ability to correct the measurement result for any sub-optimal guidewire positioning. Such methods may be useful in blood flow velocity measurements, blood flow measurements, Doppler ultrasound measurements, positioning, and signal optimization.

The present disclosure aids substantially in the measurement of intravascular flow, by improving sensor positioning and the quality of flow parameter measurements. Implemented on an ultrasound guidewire in communication with a processor, the flow measurement system disclosed herein provides practical guidewire positioning information and automatic improvement or correction of flow measurements. This augmented flow measurement system transforms a tedious, knowledge-intensive guidewire placement process into a process that can be performed with less a priori knowledge and training, without the normally routine need to take multiple measurements or interpret audible Doppler chirps. This unconventional approach improves the functioning of the flow-sensing guidewire, by providing improved guidance and outputs to the clinician.

Aspects of the present disclosure can include features described in App. No. 63/297,704, filed Jan. 8, 2022, and titled "Physiology Sensing Intraluminal Device with Index for Spectral Flow Assessment, and Associated Devices, Systems, and Methods", the entirety of which is hereby incorporated by reference herein.

The methods disclosed herein may be implemented as guidance and/or measurement outputs viewable on a display, and operated by a control process executing on a processor that accepts user inputs from a keyboard, mouse, or touchscreen interface, and that is in communication with one or more sensors. In that regard, the control process performs certain specific operations in response to different inputs or selections made at different times. Certain structures, functions, and operations of the processor, display, sensors, and user input systems are known in the art, while others are recited herein to enable novel features or aspects of the present disclosure with particularity.

These descriptions are provided for exemplary purposes only, and should not be considered to limit the scope of the flow measurement system. Certain features may be added, removed, or modified without departing from the spirit of the claimed subject matter.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. Additionally, while the description below may refer to blood vessels, it will be understood that the present disclosure is not limited to such applications. For example, the devices, systems, and methods described herein may be used in any body chamber or body lumen, including an esophagus, veins, arteries, intestines, ventricles, atria, or any other body lumen and/or chamber. For the sake of brevity, however, the numerous iterations of these combinations will not be described separately.

FIG. 1 is a diagrammatic side view of an intravascular sensing system 100 that includes an intravascular device 102 comprising a multi-filar electrical conductor bundle 230, according to aspects of the present disclosure. The intravascular device 102 can be an intravascular guidewire sized and shaped for positioning within a vessel of a patient. The intravascular device 102 can include a distal tip 108 and a sensing component 112. The sensing component 112 can be an electronic, electromechanical, mechanical, optical, and/or other suitable type of sensor. For example, the electronic component 112 can be a flow sensor configured to measure the velocity of blood flow within a blood vessel of a patient, a pressure sensor configured to measure a pressure of blood flowing within the vessel, or another type of sensor including but not limited to a temperature or imaging sensor. For example, flow data obtained by a flow sensor can be used to calculate physiological variables such as coronary flow reserve (CFR). Pressure data obtained by a pressure sensor may for example be used to calculate a physiological pressure ratio (e.g., FFR, iFR, Pd/Pa, or any other suitable pressure ratio). An imaging sensor may include an intravascular ultrasound (IVUS), intracardiac echocardiography (ICE), optical coherence tomography (OCT), or intravascular photoacoustic (IVPA) imaging sensor. For example, the imaging sensor can include one or more ultrasound transducer elements, including an array of ultrasound transducer elements.

The intravascular device 102 includes a flexible elongate member 106. The electronic component 112 is disposed at the distal portion 107 of the flexible elongate member 106. The electronic component 112 can be mounted at the distal portion 107 within a housing 280 in some embodiments. A flexible tip coil 290 extends distally from the housing 280 at the distal portion 107 of the flexible elongate member 106. A connection portion 114 located at a proximal end of the flexible elongate member 106 includes conductive portions 132, 134. In some embodiments, the conductive portions 132, 134 can be conductive ink that is printed and/or deposited around the connection portion 114 of the flexible elongate member 106. In some embodiments, the conductive portions 132, 134 are conductive, metallic rings that are positioned around the flexible elongate member. A locking section is formed by collar 118 and knob 120 are disposed at the proximal portion 109 of the flexible elongate member 106.

The intravascular device 102 in FIG. 1 includes a distal core wire 210 and a proximal core wire 220. The distal core 210 and the proximal core 220 are metallic components forming part of the body of the intravascular device 102. For example, the distal core 210 and the proximal core 220 are flexible metallic rods that provide structure for the flexible elongate member 106. The diameter of the distal core 210 and the proximal core 220 can vary along its length. A joint between the distal core 210 and proximal core 220 is surrounded and contained by a hypotube 215.

In some embodiments, the intravascular device 102 comprises a distal assembly and a proximal assembly that are electrically and mechanically joined together, which provides for electrical communication between the electronic component 112 and the conductive portions 132, 134. For example, flow data obtained by the electronic component 112 (in this example, electronic component 112 is a flow sensor) can be transmitted to the conductive portions 132, 134. Control signals (e.g., operating voltage, start/stop commands, etc.) from a processor system 306 in communication with the intravascular device 102 can be transmitted to the electronic component 112 via a connector 314 that is attached to the conductive portions 132, 134. The distal subassembly can include the distal core 210. The distal subassembly can also include the electronic component 112, the multi-filar conductor bundle 230, and/or one or more layers of insulative polymer/plastic 240 surrounding the conductive members 230 and the core 210. For example, the polymer/plastic layer(s) can insulate and protect the conductive members of the multi-filar cable or conductor bundle 230. The proximal subassembly can include the proximal core 220. The proximal subassembly can also include one or more layers of polymer layer(s) 250 (hereinafter polymer layer 250) surrounding the proximal core 220 and/or conductive ribbons 260 embedded within the one or more insulative and/or protective polymer layer(s) 250. In some embodiments, the proximal subassembly and the distal subassembly can be separately manufactured. During the assembly process for the intravascular device 102, the proximal subassembly and the distal subassembly can be electrically and mechanically joined together. As used herein, flexible elongate member can refer to one or more components along the entire length of the intravascular device 102, one or more components of the proximal subassembly (e.g., including the proximal core 220, etc.), and/or one or more components the distal subassembly 210 (e.g., including the distal core 210, etc.). The joint between the proximal core 220 and distal core 210 is surrounded by the hypotube 215.

In various embodiments, the intravascular device 102 can include one, two, three, or more core wires extending along its length. For example, in one embodiment, a single core wire extends substantially along the entire length of the flexible elongate member 106. In such embodiments, a locking section 118 and a section 120 can be integrally formed at the proximal portion of the single core wire. The electronic component 112 can be secured at the distal portion of the single core wire. In other embodiments, such as the embodiment illustrated in FIG. 1, the locking section 118 and the section 120 can be integrally formed at the proximal portion of the proximal core 220. The electronic component 112 can be secured at the distal portion of the distal core 210. The intravascular device 102 includes one or more conductive members in a multi-filar conductor bundle 230 in communication with the electronic component 112. For example, the conductor bundle 230 can include one or more electrical wires that are directly in communication with the electronic component 112. In some instances, the conductive members 230 are electrically and mechanically coupled to the electronic component 112 by, e.g., soldering. In some instances, the conductor bundle 230 comprises two or three electrical wires (e.g., a bifilar cable or a trifilar cable). An individual electrical wire can include a bare metallic conductor, or a metallic conductor surrounded by one or more insulating layers. The multi-filar conductor bundle 230 can extend along a length of the distal core 210. For example, at least a portion of the conductive members 230 can be helically, or spirally, wrapped around an entire length of the distal core 210, or a portion of the length of the distal core 210.

The intravascular device 102 includes one or more conductive ribbons 260 at the proximal portion of the flexible elongate member 106. The conductive ribbons 260 are embedded within polymer layer(s) 250. The conductive ribbons 260 are directly in communication with the conductive portions 132 and/or 134. In some instances, the multi-filar conductor bundle 230 is electrically and mechanically coupled to the electronic component 112 by, e.g., soldering. In some instances, the conductive portions 132 and/or 134 comprise conductive ink (e.g., metallic nano-ink, such as silver or gold nano-ink) that is deposited or printed directed over the conductive ribbons 260.

As described herein, electrical communication between the conductive members 230 and the conductive ribbons 260 can be established at the connection portion 114 of the flexible elongate member 106. By establishing electrical communication between the conductor bundle 230 and the conductive ribbons 260, the conductive portions 132, 134 can be in electrically communication with the electronic component 112.

In some embodiments represented by FIG. 1, intravascular device 102 includes a locking section 118 and a section 120. To form locking section 118, a machining process is necessary to remove polymer layer 250 and conductive ribbons 260 in locking section 118 and to shape proximal core 220 in locking section 118 to the desired shape. As shown in FIG. 1, locking section 118 includes a reduced diameter while section 120 has a diameter substantially similar to that of proximal core 220 in the connection portion 114. In some instances, because the machining process removes conductive ribbons in locking section 118, proximal ends of the conductive ribbons 260 would be exposed to moisture and/or liquids, such as blood, saline solutions, disinfectants, and/or enzyme cleaner solutions, an insulation layer 158 is formed over the proximal end portion of the connection portion 114 to insulate the exposed conductive ribbons.

In some embodiments, a connector 314 provides electrical connectivity between the conductive portions 132, 134 and a patient interface module or patient interface monitor 304. The patient interface module (PIM) 304 may in some cases connect to a console or processing system 306, which includes or is in communication with a display 308. In some embodiments, the patient interface module 304 includes signal processing circuitry, such as an analog-to-digital converter (ADC), analog and/or digital filters, signal conditioning circuitry, and any other suitable signal processing circuitry for processing the signals provided by the electronic component 112 for use by the processing system 306.

The system 100 may be deployed in a catheterization laboratory having a control room. The processing system 306 may be located in the control room. Optionally, the processing system 306 may be located elsewhere, such as in the catheterization laboratory itself. The catheterization laboratory may include a sterile field while its associated control room may or may not be sterile depending on the procedure to be performed and/or on the health care facility. In some embodiments, device 102 may be controlled from a remote location such as the control room, such than an operator is not required to be in close proximity to the patient.

The intraluminal device 102, PIM 304, and display 308 may be communicatively coupled directly or indirectly to the processing system 306. These elements may be communicatively coupled to the medical processing system 306 via a wired connection such as a standard copper multi-filar conductor bundle 230. The processing system 306 may be communicatively coupled to one or more data networks, e.g., a TCP/IP-based local area network (LAN). In other embodiments, different protocols may be utilized such as Synchronous Optical Networking (SONET). In some cases, the processing system 306 may be communicatively coupled to a wide area network (WAN).

The PIM 304 transfers the received signals to the processing system 306 where the information is processed and displayed on the display 308. The console or processing system 306 can include a processor and a memory. The processing system 306 may be operable to facilitate the features of the intravascular sensing system 100 described herein. For example, the processor can execute computer readable instructions stored on the non-transitory tangible computer readable medium.

The PIM 304 facilitates communication of signals between the processing system 306 and the intraluminal device 102. In some embodiments, the PIM 304 performs preliminary processing of data prior to relaying the data to the processing system 306. In examples of such embodiments, the PIM 304 performs amplification, filtering, and/or aggregating of the data. In an embodiment, the PIM 304 also supplies high- and low-voltage DC power to support operation of the intraluminal device 102 via the multi-filar conductor bundle 230.

The multi-filar cable or transmission line bundle 230 can include a plurality of conductors, including one, two, three, four, five, six, seven, or more conductors. The multi-filar conductor bundle 230 can be positioned along the exterior of the distal core 210. The multi-filar conductor bundle 230 and the distal core 210 can be overcoated with an insulative and/or protective polymer 240. In the example shown in FIG. 1, the multi-filar conductor bundle 230 includes two straight portions 232 and 236, where the multi-filar conductor bundle 230 extends linearly and parallel to a longitudinal axis of the flexible elongate member 106 on the exterior of the distal core 210, and a helical or spiral portion 234, where the multi-filar conductor bundle 230 is wrapped around the exterior of the distal core 210. In some embodiments, the multi-filar conductor bundle 230 only includes a straight portion or only includes a helical or spiral portion. In general, the multi-filar conductor bundle 230 can extend in a linear, wrapped, non-linear, or non-wrapped manner, or any combination thererof. Communication, if any, along the multi-filar conductor bundle 230 may be through numerous methods or protocols, including serial, parallel, and otherwise, wherein one or more filars of the bundle 230 carry signals. One or more filars of the multi-filar conductor bundle 230 may also carry direct current (DC) power, alternating current (AC) power, or serve as an electrical ground connection.

The display or monitor 308 may be a display device such as a computer monitor, a touch-screen display, a television screen, or any other suitable type of display. The monitor 308 may be used to display selectable prompts, instructions, and visualizations of imaging data to a user. In some embodiments, the monitor 308 may be used to provide a procedure-specific workflow to a user to complete an intraluminal imaging procedure.

Before continuing, it should be noted that the examples described above are provided for purposes of illustration, and are not intended to be limiting. Other devices and/or device configurations may be utilized to carry out the operations described herein.

Figure 2:
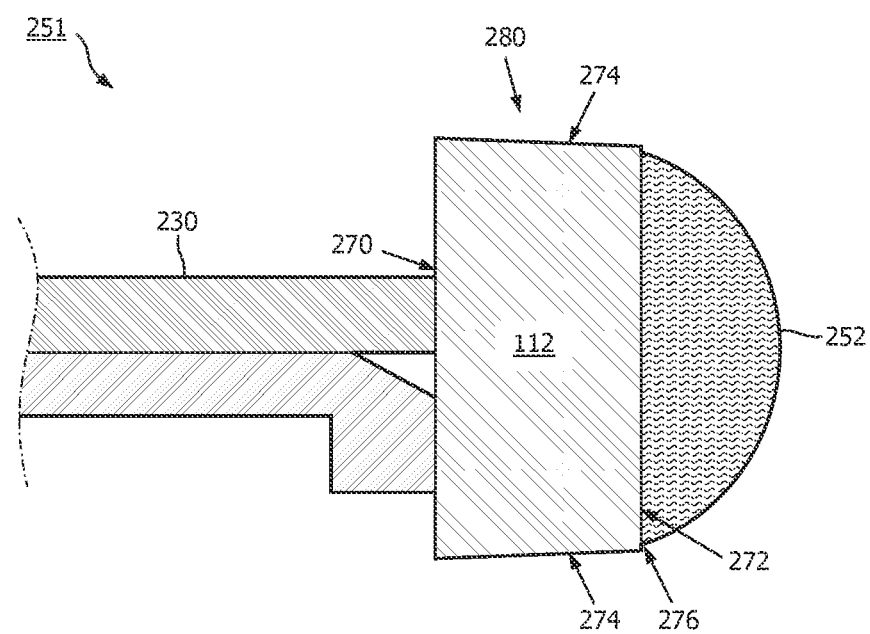
FIG. 2 is a perspective view of an example electronic component of an intravascular device, in accordance with aspects of the present disclosure.

FIG. 2 is a diagrammatic cross-sectional view of an example sensor assembly 251, which may for example be included in the intravascular device 102 of FIG. 1. More specifically, FIG. 2 illustrates a sensor assembly 251 that includes a sensing component 112, a housing 280, and an acoustic matching layer 252. As indicated by the positions of the sensing component 112 and the housing 280 illustrated in FIG. 1, the sensor assembly 251 may be included in a distal portion of the intravascular device 102 such that the surface 272 of the sensing component 112 faces distally.

As illustrated in FIG. 2, the sensing component 112 is positioned within the housing 280 and includes a proximal surface 270, an opposite, distal surface 272, and a side surface 274. In some embodiments, one or more of the proximal surface 270, the distal surface 272, or the side surface 274 may be coated in an insulating layer 276. The insulating layer 276 may be formed from parylene, which may be deposited on the one or more surfaces, for example. The insulating layer 276 may additionally or alternatively be formed from any other suitable insulating material. In some embodiments, the insulating layer 276 may prevent a short (e.g., an electrical failure), which may otherwise be caused by contact between a conductive portion of the sensing component 112 and the housing 280, which may be formed with a metal. As used herein, references to the distal surface 272 encompass the insulating layer 276 in embodiments where a distal end of the sensing component 112 is covered by the insulating layer 276, references to the proximal surface 270 encompass the insulating layer in embodiments where a proximal end of the sensing component 112 is covered by the insulating layer 276, and references to the side surface 274 encompass the insulating layer in embodiments where the side of the sensing component 112 is covered by the insulating layer 276 unless indicated otherwise.

In some embodiments, the sensing component 112 may include a transducer element, such as an ultrasound transducer element on the distal surface 272 such that the transducer element faces distally and may be used by the sensing component 112 to obtain sensor data corresponding to a structure distal of the sensing component 112. The sensing component 112 may additionally or alternatively include a transducer element on the proximal surface 270 such that the transducer faces proximally and may be used to obtain sensor data corresponding to a structure proximal of the sensing component. A transducer element may additionally or alternatively be positioned on a side surface 274 (e.g., on a perimeter or circumference) of the sensing component 112 in some embodiments.

As further illustrated, the sensing component 112 is coupled to the multi-filar conductor bundle 230, and at least a portion (e.g., a distal portion) of the multi-filar conductor bundle 230 are extends through the housing 280. In some embodiments, the multi-filar conductor bundle 230 and the sensing component 112 may be physically (e.g., mechanically) coupled. Further, one or more filars (e.g., conductive members) of the multi-filar conductor bundle 230 may electrically couple to (e.g., be in electrical communication) with the sensing component 112. In particular, one or more filars of the multi-filar conductor bundle 230 may couple to an element, such as a transducer (e.g., an ultrasound transducer), of the sensing component 112 and may provide power, control signals, an electrical ground or signal return, and/or the like to the element. As described above, such an element may be positioned on the distal surface 272 of the sensor. In that regard, in some embodiments, one or more filars of the multi-filar conductor bundle 230 may extend through a cutout or hole in the sensing component 112 (e.g., in at least the proximal surface 270) to establish electrical communication with an element on the distal surface 272 of the sensor. Filars may additionally or alternatively wrap around the side surface 274 to establish electrical communication with the element on the distal surface 272. Moreover, in some embodiments, filars of the multi-filar conductor bundle 230 may terminate at and/or electrically couple to the proximal surface 270 (e.g., to an element on the proximal surface 270) of the sensing component 112. Further, in some embodiments, a subset of the filars of the multi-filar conductor bundle 230 may extend to the distal surface 272 and/or electrically couple to an element at the distal surface 272, while a different subset of the filars may electrically couple to an element at the proximal surface 270, for example.

In some embodiments, the multi-filar conductor bundle 230 may be coated in the insulating layer 276. In some embodiments, for example, the multi-filar conductor bundle 230 and the sensing component 112 may be coupled together in a sub-assembly before being positioned in the housing 280. In such embodiments, the insulating layer 276 may be applied (e.g., coated and/or deposited) onto the entire sub-assembly, resulting in an insulating layer 276 on both the sensing component 112 and the multi-filar conductor bundle 230.

In some embodiments, the acoustic matching layer 252 may be positioned on (e.g., over) the distal surface 272 of the sensing component 112. In particular, the acoustic matching layer 252 may be disposed directly on the sensing component 112, or the acoustic matching layer 252 may be disposed on the insulating layer 276 coating the sensing component 112. Further, the acoustic matching layer 252 may be disposed on a transducer element (e.g., an ultrasound transducer element) positioned on the sensing component (e.g., the distal surface 272) and/or at least a portion of a conductive filar of the multi-filar conductor bundle 230 that is in communication with the transducer element, such as a filar extending through a hole or along a side of the sensing component 112. To that end, the acoustic matching layer 252 may contact and/or at least partially surround the portion of the conductive filar and/or the transducer element. Moreover, the acoustic matching layer 252 may provide acoustic matching to the sensing component 112 (e.g., to an ultrasound transducer of the sensing component 112). For instance, the acoustic matching layer 252 may minimize acoustic impedance mismatch between the ultrasound transducer and a sensed medium, such as a fluid and/or a lumen that the intravascular device 102 is positioned within. In that regard, the acoustic matching layer 252 may be formed from any suitable material, such as a polymer or an adhesive, to provide acoustic matching with the sensing component 112. The portion of the acoustic matching layer 252 positioned on the distal surface 272 may include and/or be formed from the same material as a portion of the acoustic matching layer positioned on the side surface 274 and/or the proximal surface 270. Further, the acoustic matching layer 252 may be applied to the sensing component 112 before or after the sensing component 112 is positioned within the housing 280 during assembly of the sensor assembly 251. In this regard, the portion of the acoustic matching layer 252 positioned on the distal surface 272 and the portion of the acoustic matching layer positioned on the side surface 274 and/or the proximal surface 270 may be included in the sensor assembly 251 in the same or different steps. Further, in addition to the one or more materials the acoustic matching layer 252 is formed from, the acoustic matching layer 252 may provide acoustic matching with the sensing component 112 via one or more dimensions of the acoustic matching layer 252.

In some embodiments, the sensor assembly 251 may include an atraumatic tip, such as the distal tip 108 illustrated in FIG. 1. In some embodiments, the distal tip 108 may include the same material as the acoustic matching layer 252. In some embodiments, the distal tip may include a different material than the acoustic matching layer 252. Additionally or alternatively the distal tip 108 may be formed from one or more layers of materials. The layers may include different materials and/or different configurations (e.g., shape and/or profile, thickness, and/or the like). Further, the distal tip 108 may be arranged to cover the distal surface 272 of the sensing component 112. In some embodiments, the distal tip 108 may also cover a distal end 272 of the housing 280. Moreover, while the distal tip 108 is illustrated as having a domed shape, embodiments are not limited thereto. In this regard, the distal tip 108 may include a flattened profile or any suitable shape. In some embodiments, the entire sensing component 112 may be positioned within (e.g., surrounded by the continuous surface of) the housing 280.

Figure 3A:
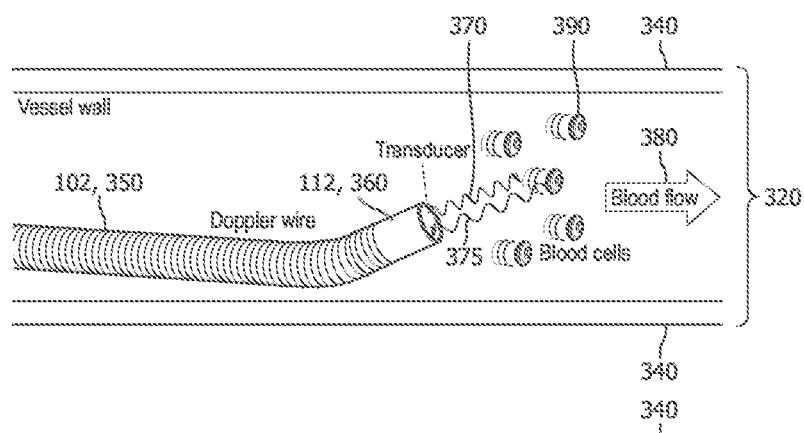
FIG. 3A is a schematic view of an intravascular during measurement of a flow velocity inside a blood vessel, in accordance with at least one embodiment of the present disclosure.

FIG. 3A is a schematic view of an intravascular device 102 (e.g., a flow-sensing guidewire 350) during measurement of a flow velocity 380 inside a blood vessel 320 with blood vessel walls 340, in accordance with at least one embodiment of the present disclosure. In the example shown in FIG. 3A, the sensor 112 (e.g., an ultrasound transducer 360) at the tip is shown to emit ultrasound waves 370 that are backscattered as reflections 375 by flowing cells 390 in the blood and sensed by the transducer 360.

Figure 3B:
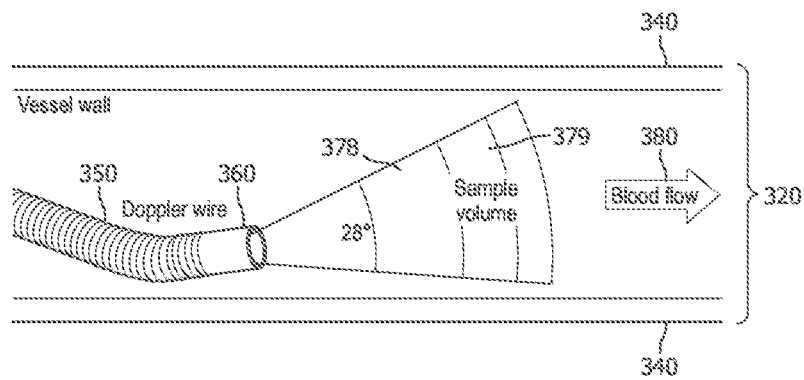
FIG. 3B is a schematic view of an intravascular device during measurement of a flow velocity inside a blood vessel, in accordance with at least one embodiment of the present disclosure.

FIG. 3B is a schematic view of an intravascular device 102 (e.g., a flow-sensing guidewire 350) during measurement of a flow velocity 380 inside a blood vessel 320 with blood vessel walls 340, in accordance with at least one embodiment of the present disclosure. In the example shown in FIG. 3B, the beam profile or viewing cone 378 of the transducer 360 is schematically shown, along with an example of the sample volume 379 over which the distribution of the flow velocity 380 is measured. This sample volume 379 results from the transducer beam profile or viewing cone 378 as well as the selected measurement distance range, as described below.

Figure 4:
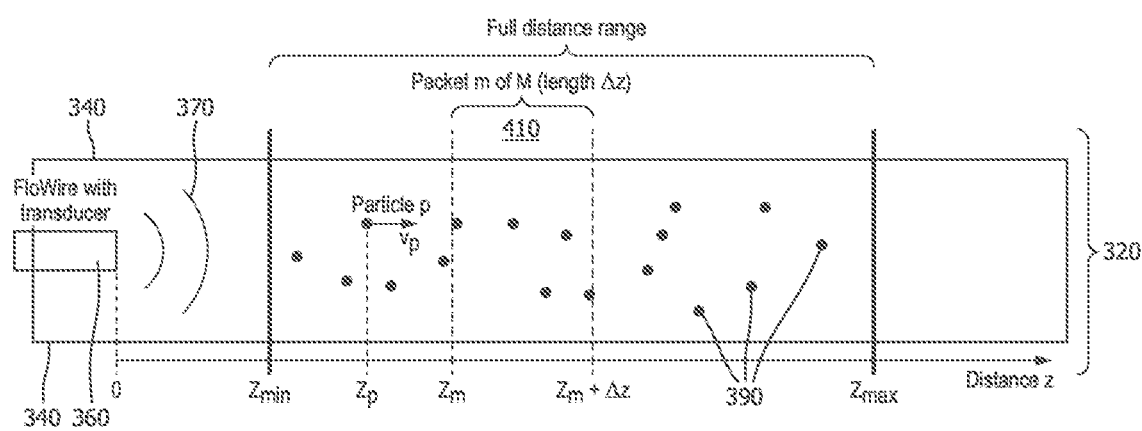
FIG. 4 is a schematic overview of a measurement of intravascular flow velocity using Doppler ultrasound, in accordance with at least one embodiment of the present disclosure.

FIG. 4 is a schematic overview of a measurement of intravascular flow velocity using Doppler ultrasound, in accordance with at least one embodiment of the present disclosure. A red blood cell velocity distribution is derived by sending an ultrasound wave or pulse 370 from the transducer 360 into the blood vessel 320. The propagating ultrasound wave or pulse 370 is backscattered by red blood cells 390. The backscattered ultrasound wave is received by the same transducer 360, which converts it into a corresponding electrical signal. In this simplified model, we only consider the axial dimension, Z. At Z=0, the transducer 360 is positioned, and creates ultrasound waves 370 that propagate in the positive Z direction. As the waves travel along the vessel, they are backscattered by cells or particles 390 in the blood. Measurement of low velocity is performed over a distance range $[Z_{min}-Z_{max}]$ in M separate packets 410 (also known as range gates), each covering a distance range of $\Delta Z$ from a minimum range $Z_m$ to a maximum range $Z_m+\Delta Z$. All particles p have a position $Z_p$ and travel along the Z direction with a velocity $V_p$ (which is usually positive but may also be negative).

Figure 5:
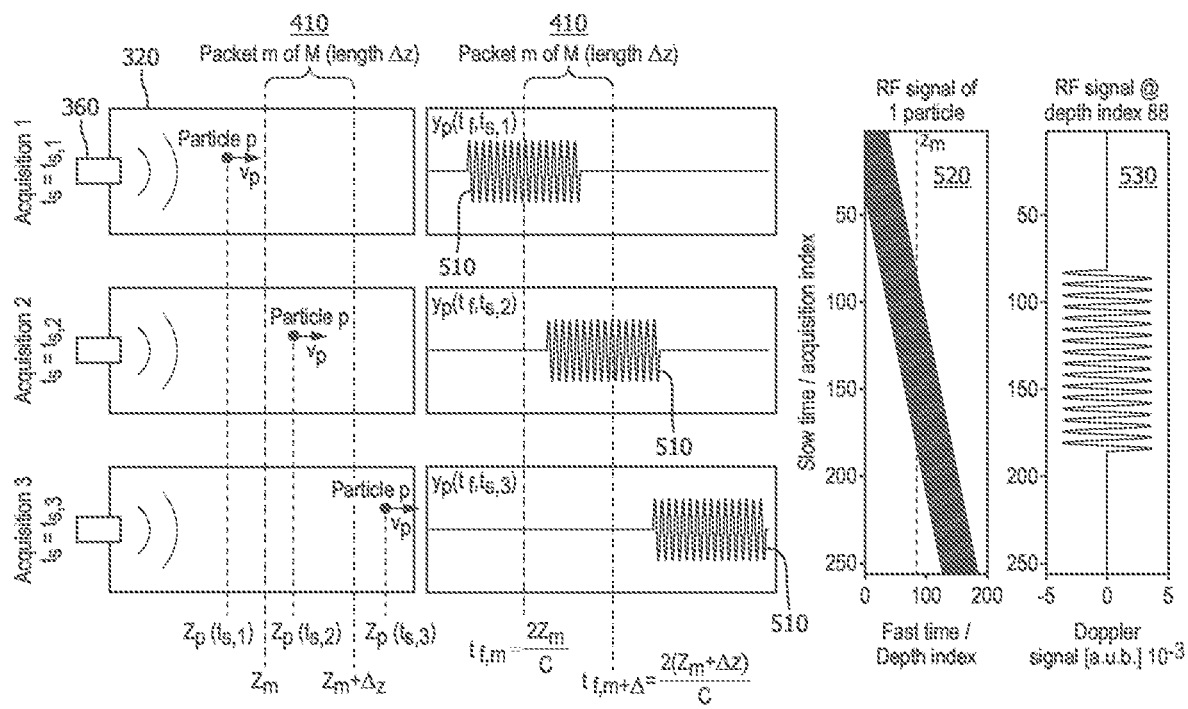
FIG. 5 is a schematic contribution of a flowing particle p within a blood vessel 320 to the Doppler signal matrix, in accordance with at least one embodiment of the present disclosure.

FIG. 5 is a schematic contribution of a flowing particle p within a blood vessel 320 to the Doppler signal matrix, in accordance with at least one embodiment of the present disclosure. So far, this disclosure has only considered a single pulse-echo acquisition. However, in a flow-sensing modality, typically an ensemble of subsequent ultrasound pulse-echo acquisitions may be considered. The pulse-echo acquisitions may for example be repeated at a constant pulse repetition interval (PRI). In order to assess velocity, an algorithm considers the displacement of scattering particles between subsequent acquisitions, considering the effect that particles have moved in-between subsequent acquisitions as opposed to moving during a single acquisition. In other words, an algorithm may neglecting the 'true' Doppler effect that would cause the frequency $f_c$ of the ultrasound wave in a single pulse-echo acquisition to change as a result of movement of the particles. Doppler analysis may be performed within so-called packets 410, which facilitates the analysis of velocity as a function of the distance Z by a suitable choice of packets with length $\Delta Z$ along the total distance range $[Z_{min}-Z_{max}]$. Graphically, this procedure is displayed in FIG. 5, which shows the pulse-echo acquisitions 510 for a single moving scattering particle as a function of slow time, whereby the slow time $t_s$ is the time covered between subsequent pulse-echo acquisitions. On the left, a particle p is shown in three successive positions as it is moving away from the transducer 360 with velocity $V_p$. In the middle, its pulse-echo contribution 510 to the received signal is shown. In the top case ($Z_p<Z_m$), the particle is already contributing to the Doppler signal at position $Z_m$ owing to the duration of the transmitted pulse. In the middle case ($Z_m<Z_p<Z_m+\Delta Z$), the particle has moved further but is still contributing to the Doppler signal within packet m. In the bottom case ($Z_p>Z_m+\Delta Z$), the particle p has moved completely out of the packet 410 and is no longer contributing to the Doppler signal 520, 530. Further to the right, this particle's contribution is shown as a 2D image with the fast time $t_f$ on the horizontal axis and the slow time is on the vertical axis. On the right, the resulting signal 530 along one particular distance/fast-time sample is displayed. The resulting signal 530 is a windowed sinusoid whose frequency (the Doppler frequency) is determined by the velocity of the particle p.

Figure 6:
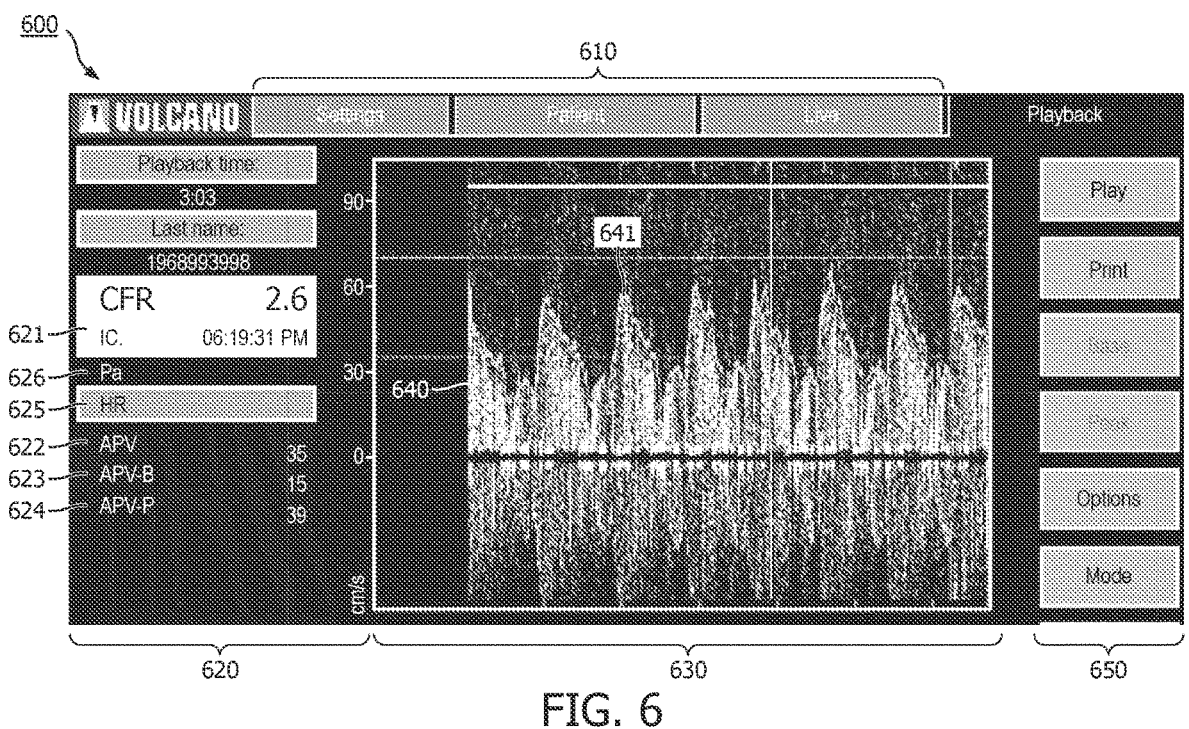
FIG. 6 is an example intravascular flow velocity measurement screen, in accordance with at least one embodiment of the present disclosure.

FIG. 6 is an example intravascular flow velocity measurement screen 600, in accordance with at least one embodiment of the present disclosure. The example intravascular flow velocity measurement screen 600 includes a control tab area 610, a control button area 650, a blood flow statistics area 620, and a waveform display area 630 that contains a waveform 640. As shown by the waveform 640, a complete red blood cell velocity distribution is acquired at regular intervals in a certain predetermined packet (volume at a certain distance from the guidewire tip). The flow velocity distribution (in the selected volume) can be graphically shown by plotting the flow velocity along the y-axis at each moment in time (x-axis), as shown by the example velocity waveform 640, and a second waveform 641 showing the instantaneous peak velocity (IPV) of the velocity waveform 640. The brightness or grey scale of the waveforms is indicative of relative incidence of a red blood cell velocity at a particular point in time.

In the example shown in FIG. 6, the blood flow statistics area 620 includes a coronary flow reserve measurement 621, an average peak velocity measurement 622, an average peak velocity baseline measurement 623, and an average peak velocity hyperaemia measurement 624, and a heart rate measurement 625.

For the clinical application the maximum blood cell velocity at each point in time is determined (instantaneous peak velocity=IPV). This IPV value is averaged over a longer period of time (several cardiac cycles) to provide the average peak velocity (APV). This APV is measured during baseline (resting) conditions (APV-B) as well as during hyperaemia (APV-P). The hyperaemia condition is induced by injecting adenosine or acetylcholine into the blood. The ratio of the two provides the so-called coronary flow reserve (CFR=APV-P/APV-B). The CFR is a clinically relevant parameter. A CFR value above 2 may be clinically accepted as a healthy coronary flow reserve which does not need treatment. A value below 2 may indicate a need or intervention or follow up. The flow velocity information is shown as a grayscale waveform image 630, 640 in a display format known as a spectral Doppler visualization. The horizontal axis represents time and the vertical axis represents velocity. The grey scale is indicative of relative incidence of a particular velocity measurement at a particular point in time. In practice, as the velocity is measured over a sample volume, a distribution of velocities is measured; each vertical line in the grayscale image 630, 640 represents this distribution, measured in the form of a Doppler spectrum. The spectrum may include an instantaneous peak velocity (IPV), which indicates the maximum velocity at any point in time. This tracing can be automatically determined from the Doppler spectrum and subsequently averaged across several heart cycles to provide the average peak velocity (APV), which is numerically shown on the left-hand side in the flow statistics area 620. The APV is measured during baseline (resting) condition (APV-B) as well as during hyperaemia (in this case after intra-arterial injection of adenosine, APV-P); the ratio of the two provides the coronary flow reserve (CFR) value. In this case, the example CFR value of 2.6 above an exemplary clinically accepted threshold of 2, which may indicate a sufficiently healthy coronary flow reserve that would generally not require intervention.

One challenge of the flow measurement modality in existing systems is that the measurement result depends on the exact positioning and orientation of the transducer with respect to the vessel. This means that an expert clinician is required to position the flow wire (e.g., the ultrasound transducer at the tip of a guidewire) in order to perform a high-quality flow measurement. The quality of the flow signal can be optimized by careful manipulation of the guidewire position and orientation while visually inspecting the signal on the screen and/or by listening to the audio signal that is derived from the flow signal (see FIGS. 7-9 for examples of bad, medium and good quality signals). The audio option is enabled by the fact that the Doppler signal (demodulated to the baseband) coincidentally happens to reside within the audible frequency range of human hearing. In clinical practice, the audio signal provides a valuable direct feedback signal for experienced users to assess the quality of the Doppler signal. This is in practice highly convenient as the user does not need to look at the screen and can fully focus on manipulation of the guidewire tip position in order to optimize the signal quality. For inexperienced users, however, the audio signal can be difficult to understand or interpret and may even be annoying. The positioning is further complicated by the fact that it needs to be done in a beating heart within moving vessels and tissue.

Figure 7:
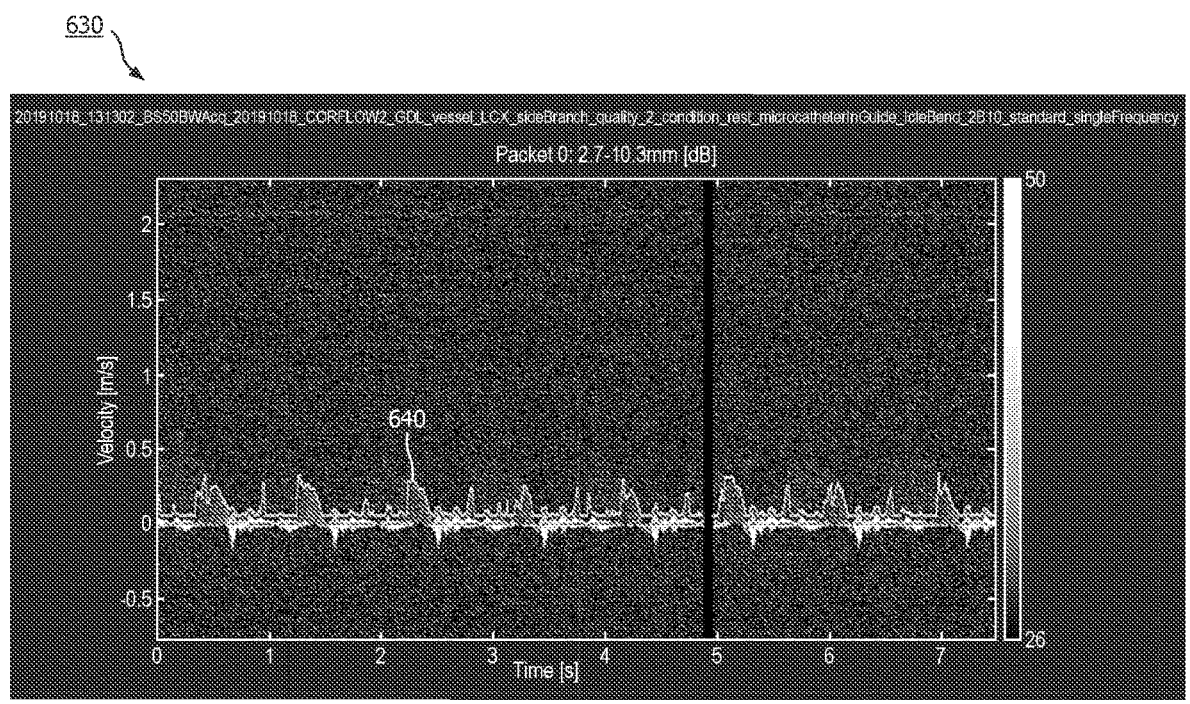
FIG. 7 is an example of a low-quality or "bad" velocity-vs-time waveform, in accordance with at least one embodiment of the present disclosure.

FIG. 7 is an example of a low-quality or "bad" velocity-vs-time waveform 640 within a waveform display area 630, in accordance with at least one embodiment of the present disclosure. Blood flow statistics calculated from such a waveform may also be of low quality, and may for example be unsuitable for determining diagnoses or treatments. The identifiable features that make this a "bad" spectrum include, but are not limited to, irregular velocity distribution peaks, large peaks of negative flow values, and low signal dynamic range over the period of a heart beat.

Figure 8:
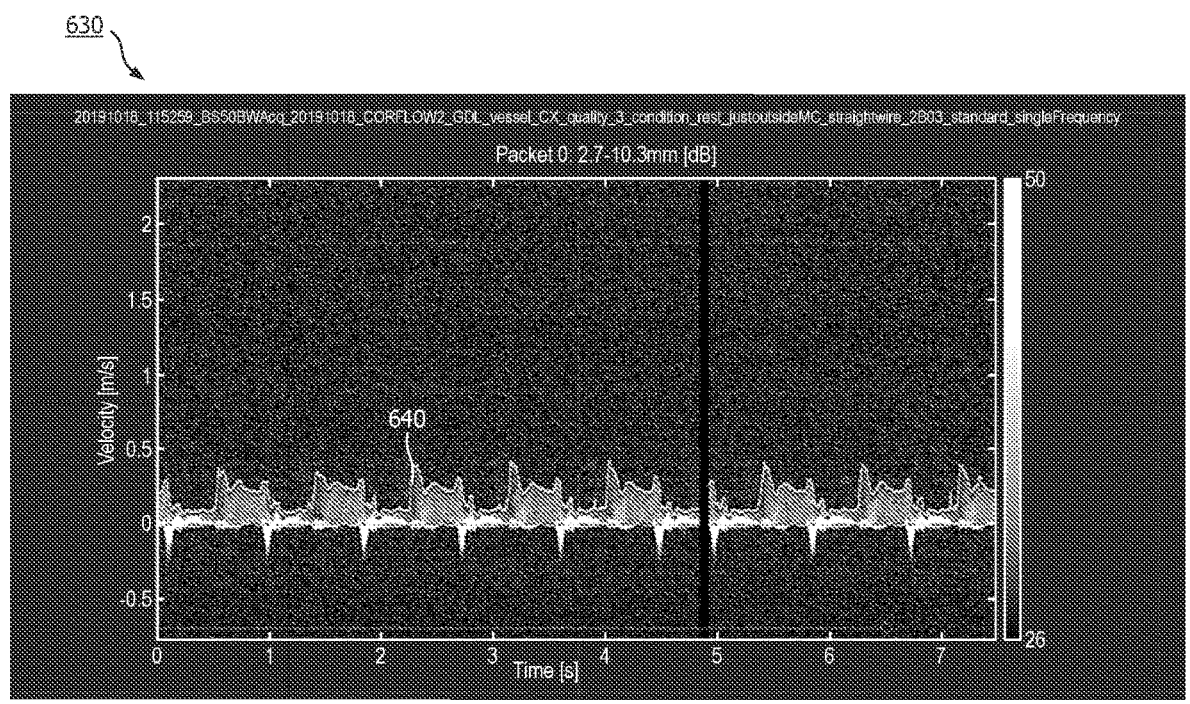
FIG. 8 is an example of a medium-quality velocity-vs-time waveform, in accordance with at least one embodiment of the present disclosure.

FIG. 8 is an example of a medium-quality velocity-vs-time waveform 640 within a waveform display area 630, in accordance with at least one embodiment of the present disclosure. Blood flow statistics calculated from such a waveform may be of moderate quality, and may for example be of limited utility in determining diagnoses or treatments. The identifiable features that make this a "medium-quality" spectrum include, but are not limited to, irregular velocity distribution peaks, low signal dynamic range over the period of a heart beat, and large peaks of negative flow values.

Figure 9:
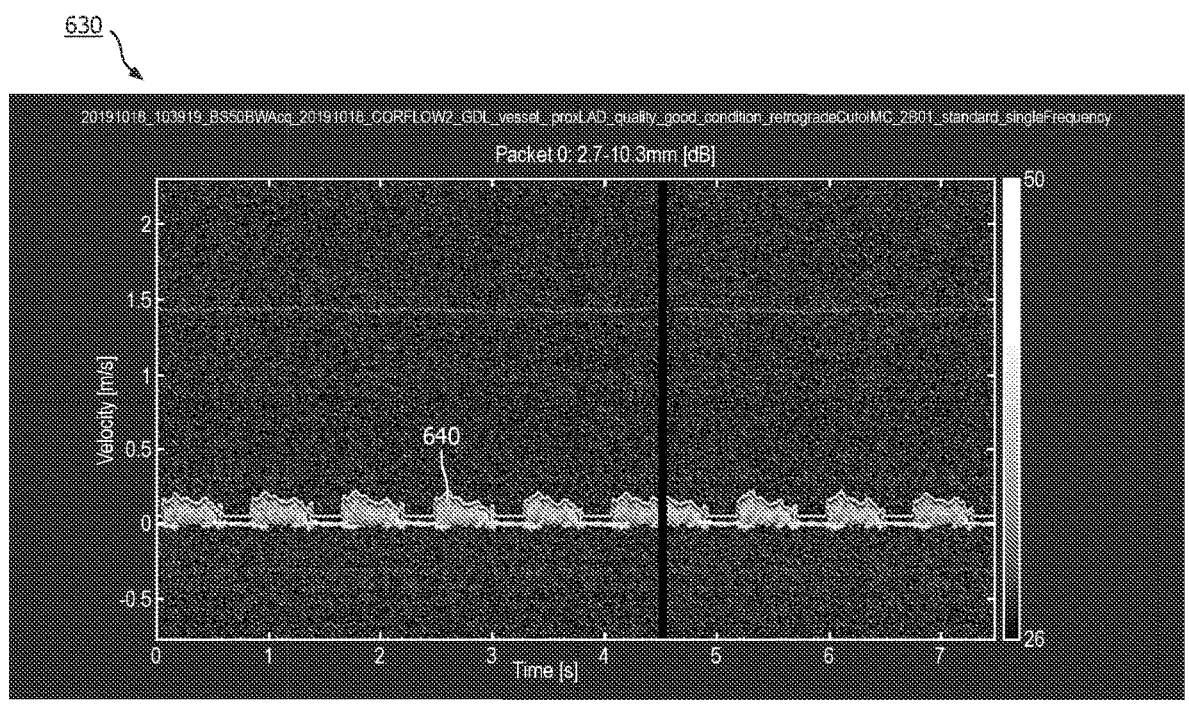
FIG. 9 is an example of a high-quality or "good" velocity-vs-time waveform, in accordance with at least one embodiment of the present disclosure.

FIG. 9 is an example of a high-quality or "good" velocity-vs-time waveform 640 within a waveform display area 630, in accordance with at least one embodiment of the present disclosure. Blood flow statistics calculated from such a waveform may also be of high quality, and may for example useful in determining diagnoses or treatments for the patient. The identifiable features that make this a "good" spectrum include regular signals as function of the heart beat, good signal dynamic range, not large peaks of negative flow values.

Figure 10:
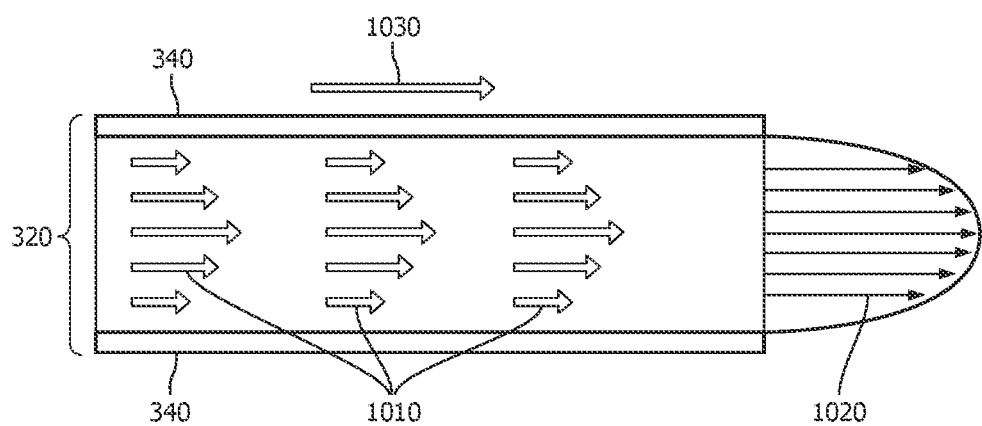
FIG. 10 is a schematic depiction of a typical laminar flow profile within a blood vessel, in accordance with at least one embodiment of the present disclosure.

FIG. 10 is a schematic depiction of a typical laminar flow profile within a blood vessel 320 with blood vessel walls 340, in accordance with at least one embodiment of the present disclosure. In an example, velocity profiles 1010 taken at different distances or times may be used to compute an average or representative velocity profile 1020, or an average speed 1030.

The sensitivity of the flow measurement with respect to position and orientation of the guidewire tip has some significant challenges. For example, clinical outcomes may be dependent upon wire placement and maintaining position during blood flow velocity measurements. The measurement may thus take significantly longer than needed, resulting in additional risks for the patient and higher costs of care. As a result, there can be significant adoption barriers for clinicians to apply flow measurements in clinical practice, and thus the group of experts that can perform high-quality measurements may be fairly limited. This may tend to limit further growth of the market-share of the flow modality in assessing Non-Obstructive Coronary Artery Disease (NO-CAD) and MicroVascular Disease (MVD).

One can identify several root causes for the undesirable measurement sensitivity. For example, the blood flow velocity is not constant throughout the cross-section of the vessel. Generally, at low velocities, the blood tends to flow without lateral mixing and exhibits a so-called laminar flow profile whereby the flow velocity is highest in the center and drops off toward the edges of the vessel. The velocity at the edge can be close to zero (e.g., a stagnant layer or boundary layer). This may for example mean that, depending on the transducer position within the cross-sectional plane of the vessel, the measured velocity profile might be different, as discussed below.

In addition, the propagation and echo of the ultrasound wave may not be limited to the blood in the vessel. The transducer beam profile may also penetrate the vessel wall and surrounding tissue. Especially in areas where the vessel is curved, the ultrasound beam may interrogate large volumes outside of the vessel. Due to cardiac movement of the tissue and vessel wall, spurious blood velocity components may be detected.

In some cases, the guidewire (and corresponding ultrasound beam) may not be well aligned with the blood flow. This means that only the axial velocity component (i.e. projected onto the central axis of the beam) is measured (cosine relation). The lateral velocity component (sine relation) is discarded or ignored by the velocity measurement. The velocity profile can also change with increasing distance from the transducer. For example, the presence of the wire can disturb the flow profile when the blood flows around it. Generally, lower velocities are observed at smaller distances from the transducer tip. However, the exact flow profile around the guidewire tip also depends on the orientation. Also, it may be that not the blood flow is not laminar in all areas. For example, at bifurcations or at partial occlusions (due to calcium or plaque) the blood flow may become chaotic or turbulent.

Figure 11A:
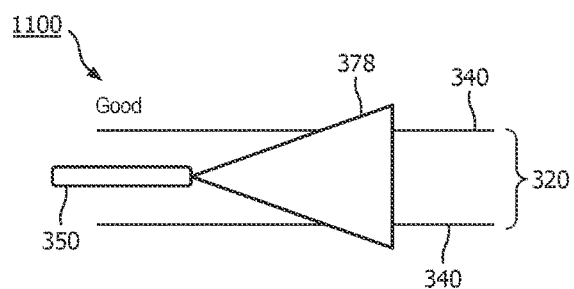
FIG. 11A is a schematic representation of guidewire position and orientation, in accordance with at least one embodiment of the present disclosure.

FIG. 11A is a schematic representation of guidewire position and orientation, in accordance with at least one embodiment of the present disclosure. In an ideal case, the guidewire 350 is straight, and is aligned with and positioned midway between the walls 340 of the blood vessel 320, such that the viewing cone 378 (e.g., a centerline of the viewing cone) is parallel with the blood vessel 320 and impinges minimally and symmetrically on the vessel walls 340, such that echoes from the vessel walls 340 do not play a major role in the ultrasound echoes returning to the transducer.

Figure 11C:
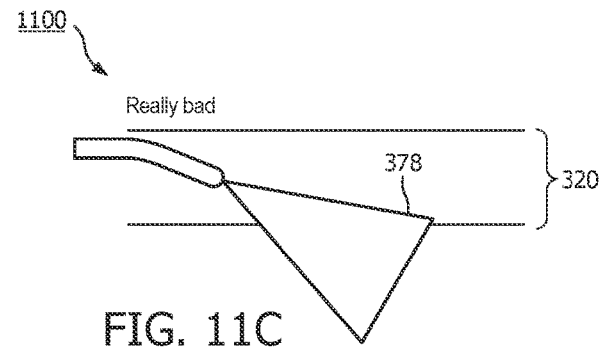
FIG. 11C is a schematic representation of guidewire position and orientation, in accordance with at least one embodiment of the present disclosure.
Figure 11B:
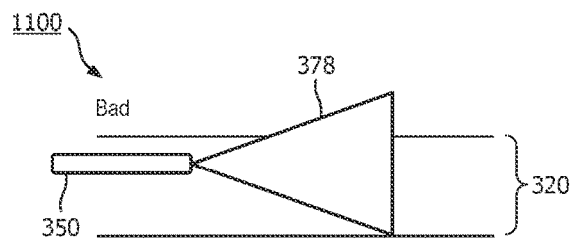
FIG. 11B is a schematic representation of guidewire position and orientation, in accordance with at least one embodiment of the present disclosure.

FIG. 11B is a schematic representation of guidewire position and orientation, in accordance with at least one embodiment of the present disclosure. In a less ideal case, the guidewire 350 is straight, and is aligned with the walls 340 of the blood vessel 320, but is laterally positioned significantly closer to one wall 340 than to the opposite wall. In such cases, the viewing cone 378 may be parallel with the blood vessel 320, but impinges significantly on one of the vessel walls 340, such that echoes from the vessel wall 340 play a more significant role in the ultrasound echoes returning to the transducer.

FIG. 11C is a schematic representation of guidewire position and orientation, in accordance with at least one embodiment of the present disclosure. In an even less ideal case, the guidewire 350 is bent, and is angularly aligned at least partially toward a wall 340 of the blood vessel 320, but is laterally positioned with the tip of the guidewire close to a centerline of the vessel. In such cases, the viewing cone 378 may be angled with respect to blood flow within the vessel 320, such that the measured blood velocity is reduced (e.g., by a cosine factor of the angle to the blood flow, as discussed below). In addition, the viewing cone 378 impinges significantly on the vessel wall 340, such that echoes from the vessel wall 340 play a significant role in the ultrasound echoes returning to the transducer.

Figure 11D:
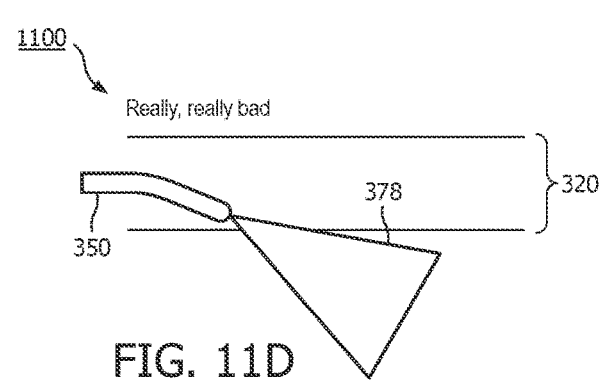
FIG. 11D is a schematic representation of guidewire position and orientation, in accordance with at least one embodiment of the present disclosure.

FIG. 11D is a schematic representation of guidewire position and orientation, in accordance with at least one embodiment of the present disclosure. In a poor measurement case, the guidewire 350 is bent, and is angularly aligned at least partially toward a wall 340 of the blood vessel 320, and is laterally positioned significantly closer to that wall 340 than to the opposite wall. In such cases, the viewing cone 378 may be angled with respect to blood flow within the vessel 320, such that the measured blood velocity is reduced (e.g., by a cosine factor of the angle to the blood flow, as discussed below), and is also reduced by the boundary layer effect that causes blood to flow more slowly near the walls of a vessel than near the center. In addition, the viewing cone 378 occurs almost entirely within the vessel wall 340, such that echoes from the vessel wall 340 play a dominant role in the ultrasound echoes returning to the transducer.

The above variety of root-causes makes it difficult for the clinical user to identify clear rules on guidewire positioning. A good quality flow measurement depends generally on craftsmanship and extensive experience of the clinician. It is an object of the present disclosure to overcome the aforementioned drawbacks and to lower the barrier for adoption of the flow modality in assessing NO-CAD and MVD.

Figure 12:
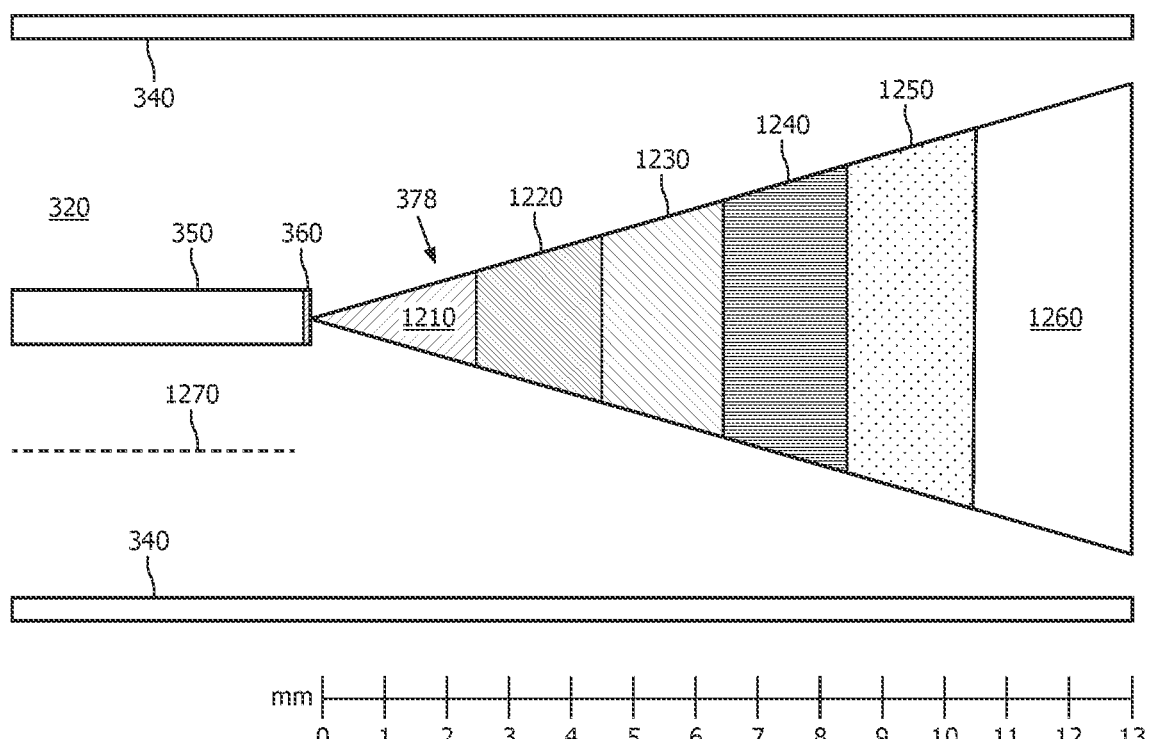
FIG. 12 is a schematic representation of the viewing cone of an ultrasound transducer mounted on the tip of a guidewire within a blood, in accordance with at least one embodiment of the present disclosure.

FIG. 12 is a schematic representation of the viewing cone 378 of an ultrasound transducer 360 mounted on the tip of a guidewire 350 within a blood vessel 320 with vessel walls 340, in accordance with at least one embodiment of the present disclosure. A longitudinal axis 1270 of the guidewire 350 is aligned with the vessel walls 340 and such that a viewing cone 378 of the ultrasound transducer 360 is also aligned with the vessel walls 340 and longitudinal axis 1270. The viewing cone 378 includes a region 1210 that is too close to the transducer 360 for accurate flow measurements, and a region 1260 that is too far from the transducer for accurate flow measurements. In the non-limiting example shown in FIG. 12, the viewing cone also include a first sample volume 1220 (e.g., Volume 1) occurring between 2.5-4.5 mm from the transducer 360, a second sample volume 1230 (e.g., Volume 2) occurring between 4.5-6.4 mm from the transducer 360, a third sample volume 1240 (e.g., Volume 3) occurring between 6.4-8.4 mm from the transducer 360, and a fourth sample volume 1250 (e.g., Volume 4) occurring between 8.4-10.4 mm from the transducer 360. The magnitude and quality of flow measurements can be affected by distance from the transducer 360, as shown below.

Figure 13B:
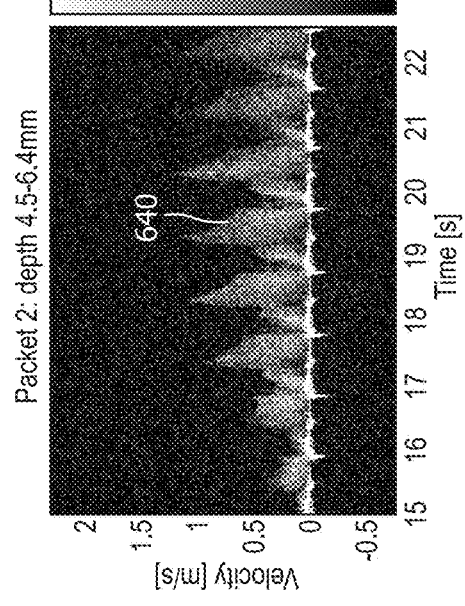
FIG. 13B is a display region showing a Doppler magnitude spectra waveform for Volume 2 of FIG. 12, in accordance with at least one embodiment of the present disclosure.
Figure 13D:
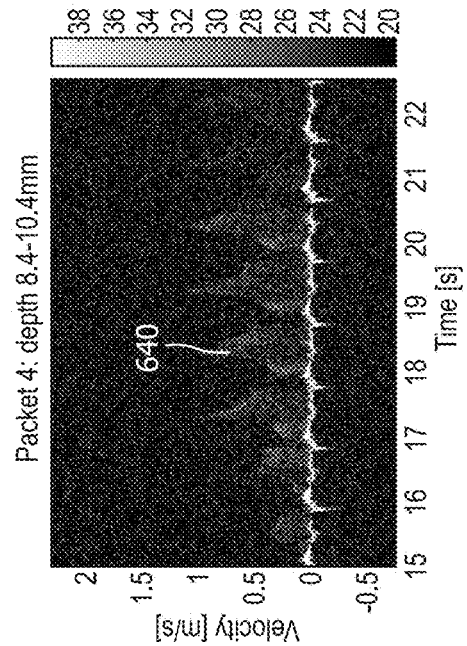
FIG. 13D is a display region showing a Doppler magnitude spectra waveform for Volume 4 of FIG. 12, in accordance with at least one embodiment of the present disclosure.
Figure 13A:
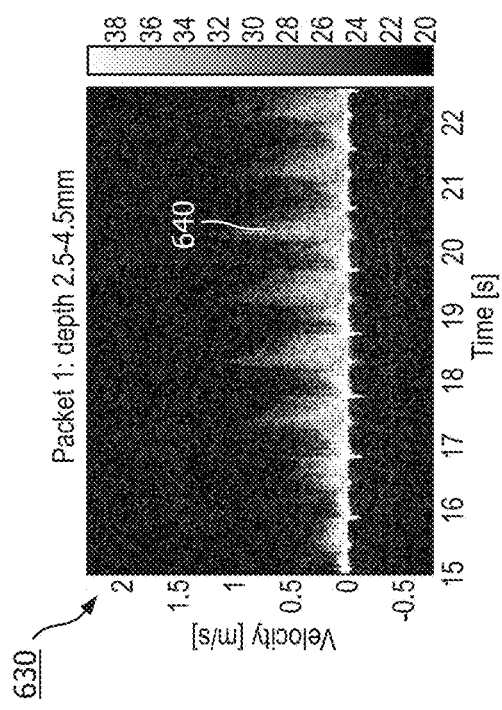
FIG. 13A is a display region showing a Doppler magnitude spectra waveform for Volume 1 of FIG. 12, in accordance with at least one embodiment of the present disclosure.

FIG. 13A is a display region 630 showing a Doppler magnitude spectra waveform 640 for Volume 1 (2.5-4.5 mm) of FIG. 12, in accordance with at least one embodiment of the present disclosure. The waveform 640 shows a higher concentration of measurements (bright areas) closer to a velocity of zero, gradually fading to a smaller concentration of velocities up to about 1.25 meters per second.

FIG. 13B is a display region 630 showing a Doppler magnitude spectra waveform 640 for Volume 2 (4.5-6.4 mm) of FIG. 12, in accordance with at least one embodiment of the present disclosure. The waveform 640 is similar to that shown in FIG. 13A, but with a more even distribution (e.g., a more uniform brightness) of velocities between zero m/s and 1.25 m/s.

Figure 13C:
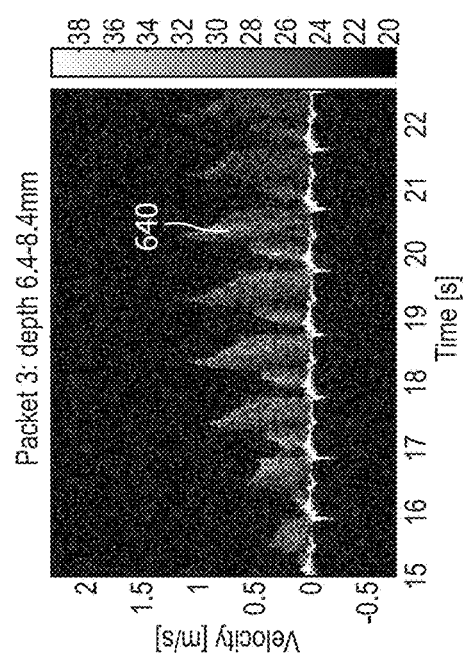
FIG. 13C is a display region showing a Doppler magnitude spectra waveform for Volume 3 of FIG. 12, in accordance with at least one embodiment of the present disclosure.

FIG. 13C is a display region 630 showing a Doppler magnitude spectra waveform 640 for Volume 3 (6.4-8.4 mm) of FIG. 12, in accordance with at least one embodiment of the present disclosure. The waveform 640 is similar to that shown in FIG. 13B, but is fainter or darker, indicating a smaller total number of particle velocity measurements (e.g., less signal strength compared to the background noise).

FIG. 13D is a display region 630 showing a Doppler magnitude spectra waveform 640 for Volume 4 (8.4-10.4 mm) of FIG. 12, in accordance with at least one embodiment of the present disclosure. The waveform 640 is similar to that shown in FIG. 13C, but is even fainter or darker, indicating a very small total number of particle velocity measurements (e.g., low signal strength compared to the background noise).

To avoid the various issues described above, several solutions can be developed to provide clear and unambiguous guidance to the user on correct positioning and orientation of the guidewire. This guidance should be easy to understand and not require lengthy training or extensive experience (as is presently the case for the audio signal).

Figure 14A:
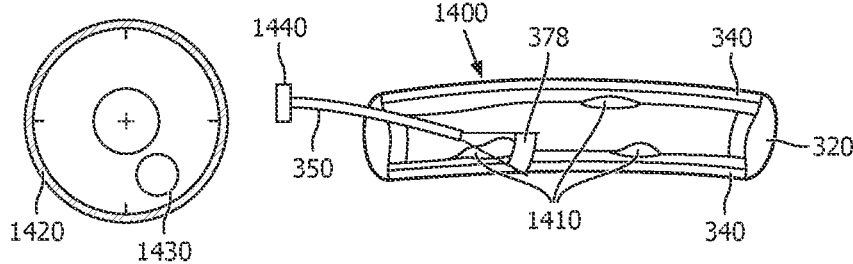
FIG. 14A shows a bull's eye type or spirit level type of indicator that can be added to a user interface to provide guidance on guidewire positioning and orientation, in accordance with at least one embodiment of the present disclosure.

FIG. 14A shows a bull's eye type or spirit level type of indicator 1420 that can be added to a user interface to provide guidance on guidewire positioning and orientation, in accordance with at least one embodiment of the present disclosure. In the example shown in FIG. 14A, the indicator 1420 includes a guiding dot 1430 which is colored a warning color (e.g., red) and is positioned significantly off-center, indicating a poor alignment of the guidewire 350 for flow measurements within the blood vessel 320. Such a configuration for the indicator 1420 may warn the clinician to rotate or otherwise reposition the guidewire in order to improve the flow measurement.

As can be seen in the blood vessel diagram 1400, the guidewire 350 is positioned between the vessel walls 340 and several blockages 1410 (e.g., plaques, clots, etc.), such that the viewing cone 378 has a highly obstructed view. Also visible is a rotary encoder 1440, which enables the system and/or the clinician to know the rotation angle or clock angle of the guidewire 350 around its long axis, which can be used to deduce the direction a bent guidewire 350 may be pointing within the vessel 320.

Figure 14B:
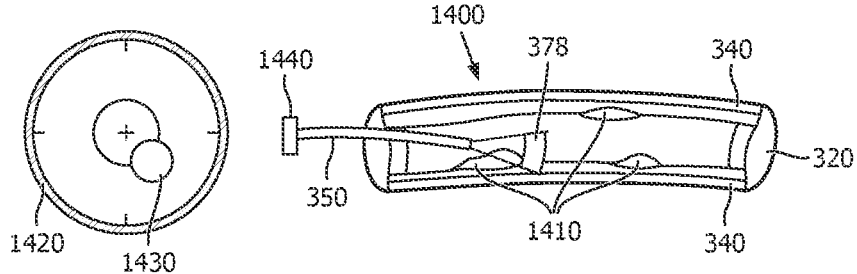
FIG. 14B shows a bull's eye type or spirit level type of indicator that can be added to a user interface to provide guidance on guidewire positioning and orientation, in accordance with at least one embodiment of the present disclosure.

FIG. 14B shows a bull's eye type or spirit level type of indicator 1420 that can be added to a user interface to provide guidance on guidewire positioning and orientation, in accordance with at least one embodiment of the present disclosure. In the example shown in FIG. 14B, the indicator 1420 includes a guiding dot 1430 which is colored a cautionary color (e.g., orange or yellow) and is positioned partially off-center, indicating a moderately poor alignment of the guidewire 350 for flow measurements within the blood vessel 320. Such a configuration for the indicator 1420 may warn the clinician to rotate or otherwise reposition the guidewire in order to improve the flow measurement.

As can be seen in the blood vessel diagram 1400, the guidewire 350 is positioned between the vessel walls 340 and several blockages 1410 (e.g., plaques, clots, etc.), such that the viewing cone 378 has a partially obstructed view. Also visible is the rotary encoder 1440.

Figure 14C:
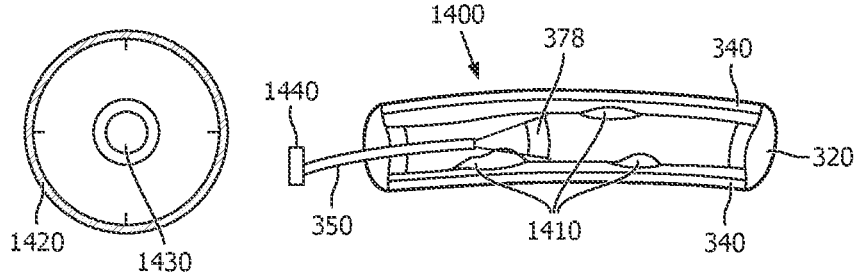
FIG. 14C shows a bull's eye type or spirit level type of indicator that can be added to a user interface to provide guidance on guidewire positioning and orientation, in accordance with at least one embodiment of the present disclosure.

FIG. 14C shows a bull's eye type or spirit level type of indicator 1420 that can be added to a user interface to provide guidance on guidewire positioning and orientation, in accordance with at least one embodiment of the present disclosure. In the example shown in FIG. 14B, the indicator 1420 includes a guiding dot 1430 which is colored a positive color (e.g., green) and is positioned centrally within the indicator 1420, indicating a good alignment of the guidewire 350 for flow measurements within the blood vessel 320. Such a configuration for the indicator 1420 may confirm for the clinician that accurate flow measurements may now take place.

As can be seen in the blood vessel diagram 1400, the guidewire 350 is positioned between the vessel walls 340 and several blockages 1410 (e.g., plaques, clots, etc.), such that the viewing cone 378 has a largely unobstructed view. Also visible is the rotary encoder 1440.

Figure 15:
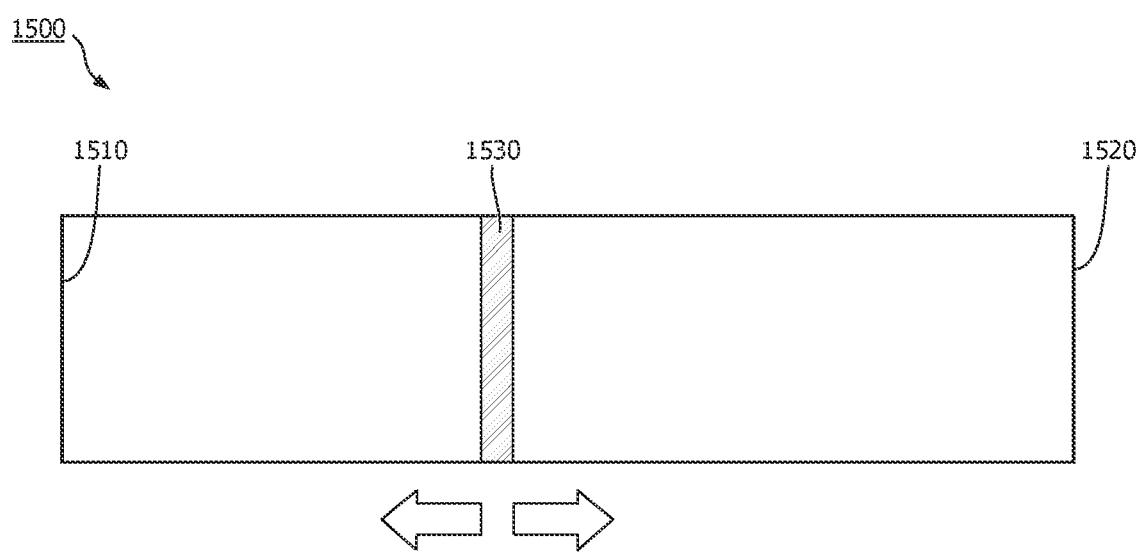
FIG. 15 shows a user interface feature or linear indicator 1500 that can be added to a user interface to provide guidance on guidewire positioning and orientation, in accordance with at least one embodiment of the present disclosure.

FIG. 15 shows a user interface feature or linear indicator 1500 that can be added to a user interface to provide guidance on guidewire positioning and orientation, in accordance with at least one embodiment of the present disclosure. In the example shown in FIG. 15, the linear indicator 1500 includes a high-quality side 1510 (which may for example be colored green or white) and a low-quality side 1520 (which may for example be colored red or black), and a sliding marker 1530 that may move left and right as the clinician rotates or otherwise moves the guidewire, indicating improvement or worsening of the guidewire positioning for accurate flow measurement. In an example, the clinician may not want to record measurements unless the indicator 1500 is more than halfway, or more than three quarter of the way, toward the high-quality side 1510.

Figure 16A:
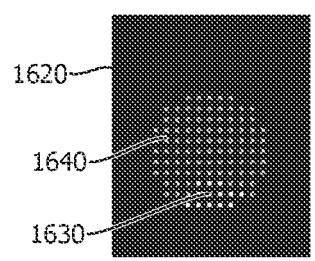
FIG. 16A is a visualization of the aggregation of information during the process of moving the guidewire in the vessel until a sufficient result quality is achieved, in accordance with at least one embodiment of the present disclosure.
Figure 16A:
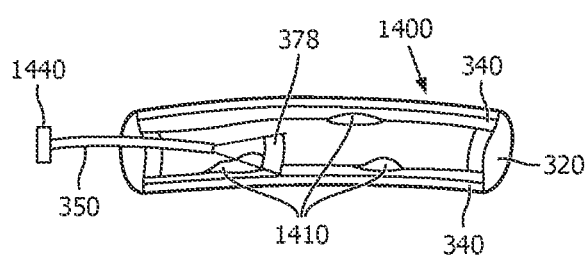

FIG. 16A is a visualization of the aggregation of information during the process of (semi-randomly) moving the guidewire in the vessel until a sufficient result quality is achieved, in accordance with at least one embodiment of the present disclosure. The system of the present disclosure may automatically select the high-quality measurement portions (samples) from a series of measurements at different (random) guidewire positions and orientations (measured, for example, with a rotary encoder 1440), and discard all other signals. During this process, the information from the good signal portions can be aggregated until a sufficient quality level for the result is achieved. An example of how the aggregation of information can be visualized on the screen is shown in FIGS. 16A-16C.

The blood vessel diagram 1400 for FIG. 16A is the same as the blood vessel diagram 1400 for FIG. 14A, wherein the guidewire 350 is positioned between the vessel walls 340 and several blockages 1410 (e.g., plaques, clots, etc.), such that the viewing cone 378 has a highly obstructed view. Also visible is the rotary encoder 1440, which enables the system and/or the clinician to know the rotation angle or clock angle of the guidewire 350 around its long axis, which can be used to deduce the direction a bent guidewire 350 may be pointing within the vessel 320.

An examine user interface feature 1620 includes a plurality of "valid" spots 1630 and "invalid" spots 1640 representing different positions in an exemplary cross section of the blood vessel 320. As the aggregated information about the blood vessel is accumulated, corresponding portions of the user feature 1620 are filled in, such that "invalid" spots 1640 (which may for example be colored dark gray or red) are switched to or filled in as "valid" spots 1630 (which may for example be colored white or green, or any other desired color). In the example of FIG. 16A, the poor alignment and positioning of the guidewire 350 results in valid spots 1630 indicating valid information about only a small portion of the blood vessel 320.

Figure 16B:
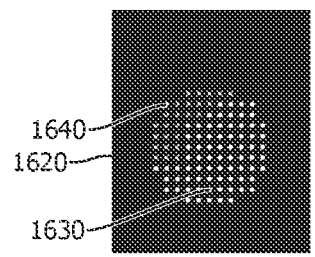
FIG. 16B is a visualization of the aggregation of information during the process of moving the guidewire in the vessel until a sufficient result quality is achieved, in accordance with at least one embodiment of the present disclosure.
Figure 16B:
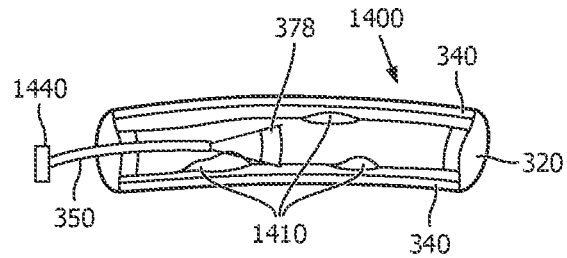
Figure 16C:
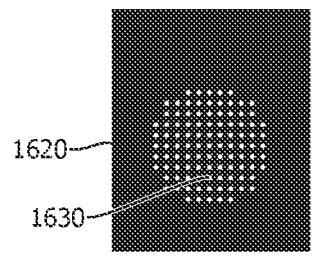
FIG. 16C is a visualization of the aggregation of information during the process of moving the guidewire in the vessel until a sufficient result quality is achieved, in accordance with at least one embodiment of the present disclosure.
Figure 16C:
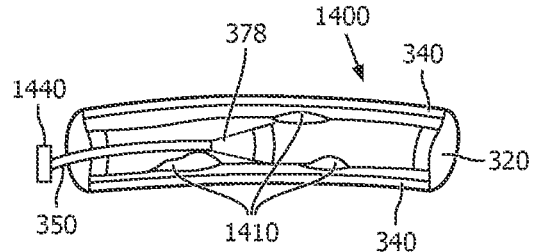

FIG. 16B is a visualization of the aggregation of information during the process of (semi-randomly) moving the guidewire in the vessel until a sufficient result quality is achieved, in accordance with at least one embodiment of the present disclosure. The blood vessel diagram 1400 for FIG. 16B is the same as the blood vessel diagram 1400 for FIG. 14B, wherein the guidewire 350 is positioned between the vessel walls 340 and several blockages 1410 (e.g., plaques, clots, etc.), such that the viewing cone 378 has a partially obstructed view. Also visible is the rotary encoder 1440. In the example of FIG. 16B, the moderately good alignment and positioning of the guidewire 350 results in valid spots 1630 indicating valid information about a majority of the blood vessel 320. However, a portion of the vessel has not yet received valid measurements, as indicated by the invalid spots 1640 in the upper left of the user interface feature 1620.

FIG. 16C is a visualization of the aggregation of information during the process of (semi-randomly) moving the guidewire in the vessel until a sufficient result quality is achieved, in accordance with at least one embodiment of the present disclosure. The blood vessel diagram 1400 for FIG. 16C is the same as the blood vessel diagram 1400 for FIG. 14C, wherein the guidewire 350 is positioned between the vessel walls 340 and several blockages 1410 (e.g., plaques, clots, etc.), such that the viewing cone 378 has an unobstructed view. Also visible is the rotary encoder 1440. In the example of FIG. 16C, the proper alignment and positioning of the guidewire 350 results in valid spots 1630 within the user interface feature 1620, indicating that valid information has been acquired for a complete cross section of the blood vessel 320. No invalid spots 1640 are visible, indicating that movement (e.g., rotation, translation, or wiggling) of the guidewire 350 is no longer needed in order to facilitate data acquisition.

Figure 17:
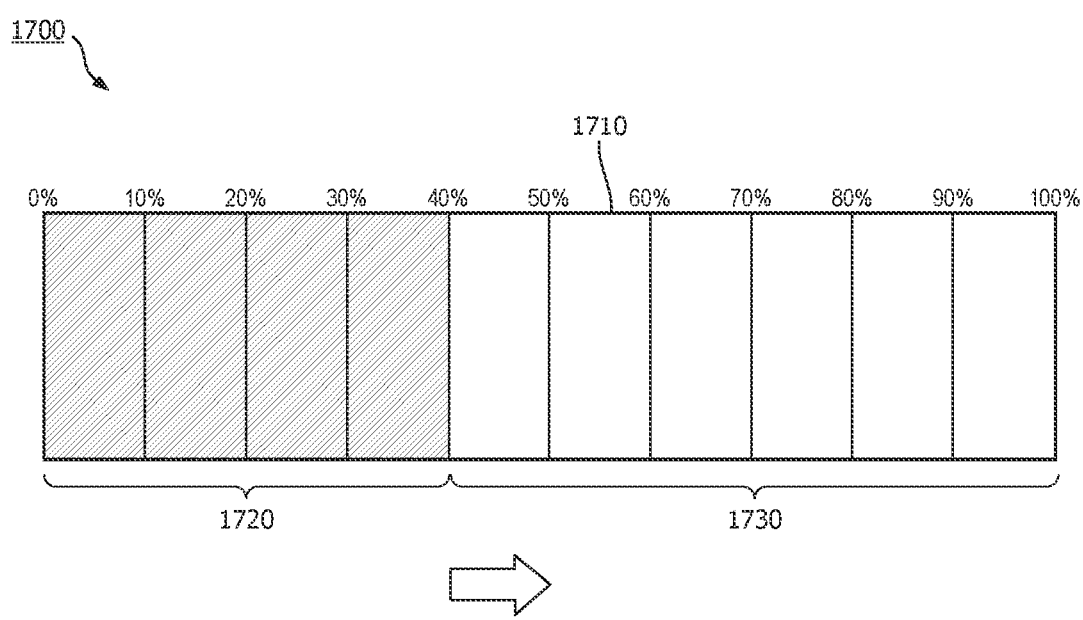
FIG. 17 is a user interface feature or linear indicator indicating a percentage of data acquisition completed, in accordance with at least one embodiment of the present disclosure.

FIG. 17 is a user interface feature or linear indicator 1700 indicating a percentage of data acquisition completed, in accordance with at least one embodiment of the present disclosure. The linear indicator 1700 includes a numerical or percentage scale 1710 ranging from 0% to 100% (or, alternatively, from 0.0 to 1.0, or any other numerical scale 1710 that conveys a fraction or percentage to the user). The linear indicator 1700 also includes a completed region 1720 (e.g., colored green, or any other desired color) and an uncompleted region 1730 (e.g., colored red, black, gray, or any other desired color). As the guidewire is manipulated (e.g., translated, rotated, wiggled, etc.) to facilitate data acquisition, the linear indicator 1700 shows an increase in the percentage of data acquired by increasing the completed region 1720 and decreasing the uncompleted region 1730. When the indicator shows 100% completion (or any other clinically defined threshold), the clinician may know that data acquisition is complete, and that no further manipulation of the guidewire is necessary).

It should be understood that other types of completion indicators may be used instead or in addition, including but not limited to bar charts, pie charts, binary indicators (e.g., a single "complete" lamp that switches on, or switches from red to green, upon completion of data acquisition), analog indicators, or digital indicators in any desired orientation.

Figure 18A:
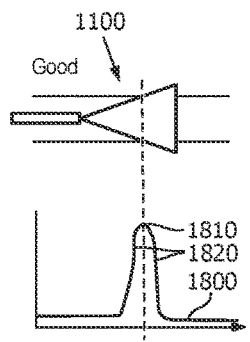
FIG. 18A includes a schematic and graphical representation of how the ultrasound echo signal is influences by wall reflections, in accordance with at least one embodiment of the present disclosure.

FIG. 18A includes a schematic and graphical representation of how the ultrasound echo signal is influenced by wall reflections, in accordance with at least one embodiment of the present disclosure. The vessel diagram 1100 for FIG. 18A is the same as the vessel diagram of FIG. 11A, wherein the guidewire 350 is straight, and is aligned with and positioned midway between the walls 340 of the blood vessel 320, such that the viewing cone 378 (e.g., a centerline of the viewing cone) is parallel with the blood vessel 320 and impinges minimally and symmetrically on the vessel walls 340, such that echoes from the vessel walls 340 do not play a major role in the ultrasound echoes returning to the transducer.

A resulting waveform or spectrum 1800 may for example represent velocity or frequency along the X-axis, and along the Y-axis the number of samples measured at that velocity or frequency. The waveform or spectrum 1800 of FIG. 18A shows a symmetric form, with a central peak 1810 and well-defined symmetric shoulders 1820.

Figure 18B:
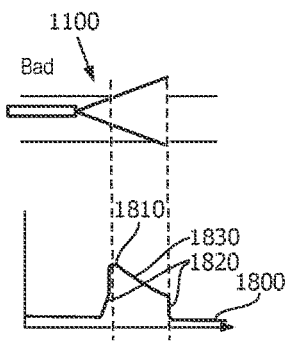
FIG. 18B includes a schematic and graphical representation of how the ultrasound echo signal is influences by wall reflections, in accordance with at least one embodiment of the present disclosure.

FIG. 18B includes a schematic and graphical representation of how the ultrasound echo signal is influences by wall reflections, in accordance with at least one embodiment of the present disclosure. The vessel diagram 1100 for FIG. 18B is the same as the vessel diagram of FIG. 11B, wherein the guidewire 350 is straight, and is aligned with the walls 340 of the blood vessel 320, but is positioned significantly closer to one wall 340 than to the opposite wall. In such cases, the viewing cone 378 may be parallel with the blood vessel 320, but impinges significantly on one of the vessel walls 340, such that echoes from the vessel wall 340 play a more significant role in the ultrasound echoes returning to the transducer. The waveform or spectrum 1800 of FIG. 18A shows an asymmetric, form, with an off-center peak 1810 that is lower than the peak 1810 of FIG. 18A or with reduced gray-level intensity compared to the waveform or spectrum 1800 of FIG. 18A. The waveform or spectrum 1800 of FIG. 18B also shows nearly vertical shoulders 1820, separated by a slanting "wall echo" region.

Figure 18C:
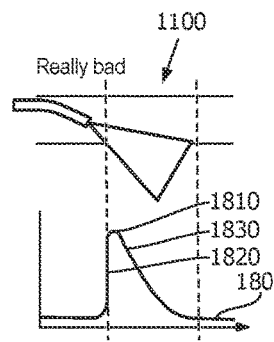
FIG. 18C includes a schematic and graphical representation of how the ultrasound echo signal is influences by wall reflections, in accordance with at least one embodiment of the present disclosure.

FIG. 18C includes a schematic and graphical representation of how the ultrasound echo signal is influences by wall reflections, in accordance with at least one embodiment of the present disclosure. The vessel diagram 1100 for FIG. 18C is the same as the vessel diagram of FIG. 11C, wherein the guidewire 350 is bent, and is aligned at least partially toward a wall 340 of the blood vessel 320, but is positioned with the tip of the guidewire close to a centerline of the vessel. In such cases, the viewing cone 378 may be angled with respect to blood flow within the vessel 320, such that the measured blood velocity is reduced (e.g., by a cosine factor of the angle to the blood flow, as discussed below). In addition, the viewing cone 378 impinges significantly on the vessel wall 340, such that echoes from the vessel wall 340 play a significant role in the ultrasound echoes returning to the transducer. The waveform or spectrum 1800 shows an off-center peak 1810 with one nearly vertical shoulder 1820 and one sloping shoulder 1830, or with a reduced gray-level intensity that may vary along the time axis.

Figure 18D:
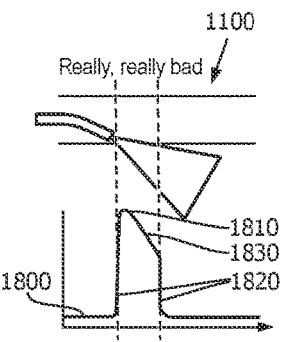
FIG. 18D includes a schematic and graphical representation of how the ultrasound echo signal is influences by wall reflections, in accordance with at least one embodiment of the present disclosure.

FIG. 18D includes a schematic and graphical representation of how the ultrasound echo signal is influences by wall reflections, in accordance with at least one embodiment of the present disclosure. The vessel diagram 1100 for FIG. 18D is the same as the vessel diagram of FIG. 11D, wherein the guidewire 350 is bent, and is aligned at least partially toward a wall 340 of the blood vessel 320, and is positioned significantly closer to that wall 340 than to the opposite wall. In such cases, the viewing cone 378 may be angled with respect to blood flow within the vessel 320, such that the measured blood velocity is reduced (e.g., by a cosine factor of the angle to the blood flow, as discussed below), and is also reduced by the boundary layer effect that causes blood to flow more slowly near the walls of a vessel than near the center. In addition, the viewing cone 378 occurs almost entirely within the vessel wall 340, such that echoes from the vessel wall 340 play a dominant role in the ultrasound echoes returning to the transducer. The waveform or spectrum 1800 shows an off-center peak 1810 with two nearly vertical shoulders 1820 separated by a sloping region 1830. The overall signal dynamic range may be much smaller than in FIGS. 18A-18C, and the gray level values may vary significantly along the time axis.

Such waveforms 1800 can in principle be used by a clinician to diagnose guidewire placement issues and determine whether valid samples are being measured. Therefore, as with the user interface features shown in FIGS. 14-17, a user interface displaying such a waveform 1800 in real time may have substantial clinical value. However, like the audible Doppler chirp, it may require significant training and experience to interpret correctly, and may thus present a barrier to adoption of Doppler guidewire blood flow measurements.

Accordingly, a need exists for more autonomous Doppler measurement systems that are able to reconstruct or deduce valid flow information even from a guidewire that is not ideally positioned or oriented. Such flow information corrections may for example be based on the waveforms 1800 shown in FIGS. 18A-18D, either through pattern matching, through geometric transformation, through deep-learning algorithms trained to recognize and compensate for guidewire positioning or alignment errors, or through improved measurement techniques. Non-limiting embodiments of such systems are disclosed in FIGS. 19-23.

Figure 19:
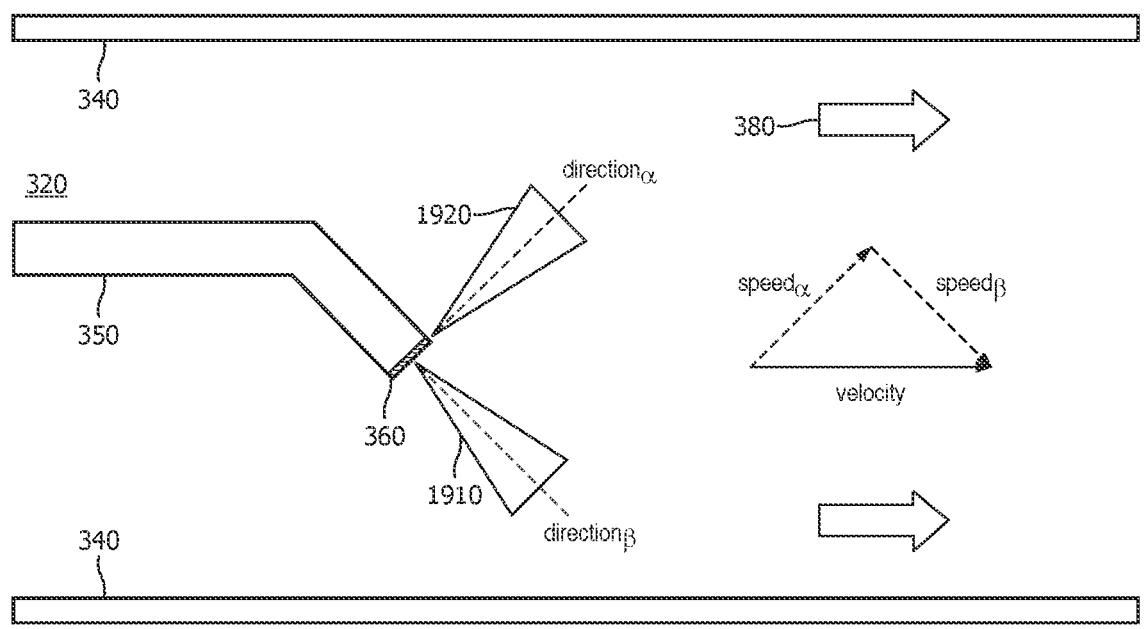
FIG. 19 shows an exemplary guidewire with a transducer that emits a primary ultrasound pulse or wave in a direction β, and a shear wave in an orthogonal direction α, in accordance with at least one embodiment of the present disclosure.

FIG. 19 shows an exemplary guidewire 350 with a transducer 360 that emits a primary ultrasound pulse or wave 1910 in a direction $\beta$, and a shear wave 1920 in an orthogonal direction $\alpha$, in accordance with at least one embodiment of the present disclosure. In some cases, the primary wave 1910 (e.g., at a wavelength of X) may form a cone as it propagates. In some cases, the shear wave 1920 (e.g., at a wavelength of $\lambda/2$) may form a cone, disc, or toroid as it propagates. In some embodiments, the transducer 360 is configured to receive echoes from both the primary wave 1910 and the shear wave 1920. Based on the blood flow 380, a processor operatively coupled to the transducer 360 may then compute (based on Doppler measurements as described above) a speed in the $\alpha$ direction based on the echo of the shear wave 1920, and a speed in the orthogonal β direction based on the echo of the primary wave 1910, at different locations within the vessel. The blood flow velocity at that location is then the vector sum of the speeds in the α and β directions.

Such an arrangement can make use of a property of single transducer elements to detect ultrasound signals from multiple (orthogonal) directions by making use of the shear wave of a piezo transducer element (see e.g. A. Voleisis et al. Ultragarsas (Ultrasound) Vol. 66 No. 1, 2011 pp. 25-31 for discussion of the shear wave). In an example, the guidewire orientation can be derived by making use of the flow velocity components along the two orthogonal directions, and to reconstruct an accurate flow velocity.

Figure 20:
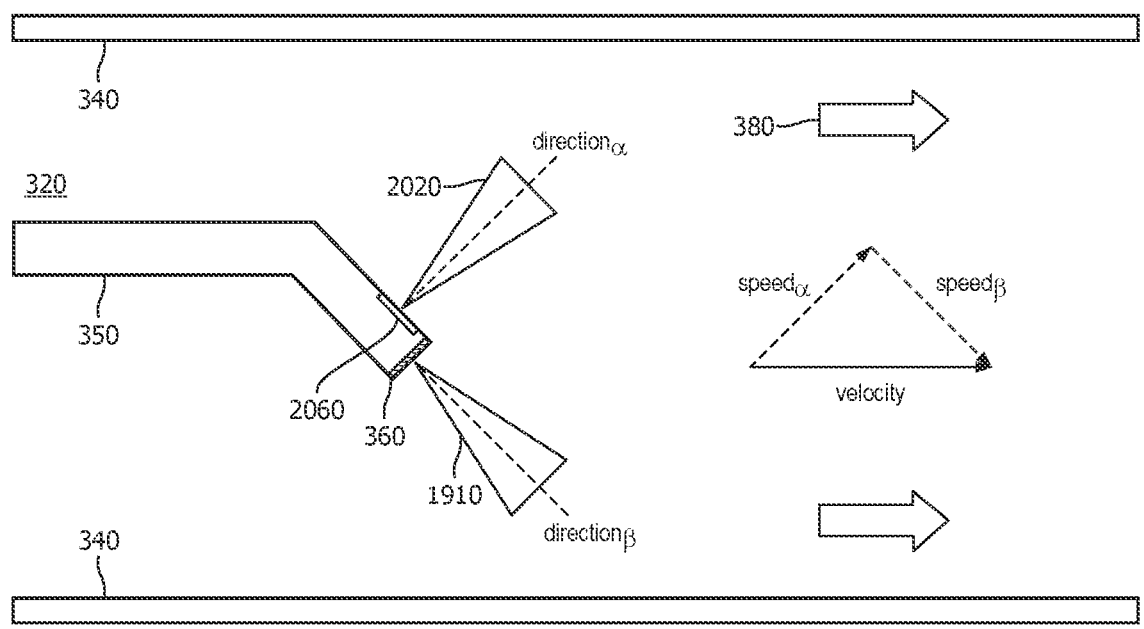
FIG. 20 shows an exemplary guidewire with a transducer that emits a primary ultrasound pulse or wave in a direction β, and second transducer that emits a primary wave in an orthogonal direction α, in accordance with at least one embodiment of the present disclosure.

FIG. 20 shows an exemplary guidewire 350 with a transducer 360 that emits a primary ultrasound pulse or wave 1910 in a direction β, and second transducer 2060 that emits a primary wave 2020 in an orthogonal direction α, in accordance with at least one embodiment of the present disclosure. As in FIG. 19, a processor operatively coupled to the transducer 360 may then compute (based on Doppler measurements as described above) a speed in the α direction based on the echo of the primary wave 2020, and a speed in the orthogonal β direction based on the echo of the primary wave 1910, at different locations within the vessel. The blood flow velocity at that location is then the vector sum of the speeds in the α and β directions.

Such an arrangement permits information from a wide range of angles to be available for analysis. This can either be done by selecting signals from different transducer elements in a sequential way, or by beamforming, both in transmit (beam steering) as well as during receive (e.g. via synthetic aperture beamforming). It should be understood that a plurality of different transducers 2060 may be provided, at a variety of different locations or orientations on the guidewire 350.

Figure 21:
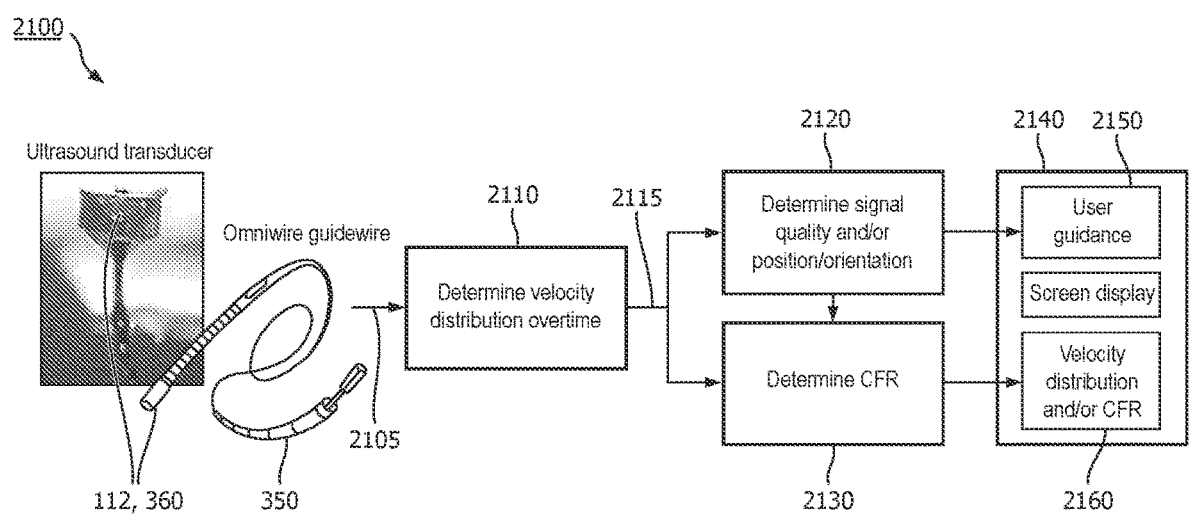
FIG. 21 is a block diagram showing an exemplary algorithm for guidewire position/orientation detection or signal quality improvement, in accordance with at least one embodiment of the present disclosure.

FIG. 21 is a block diagram showing an exemplary algorithm 2100 for guidewire position/orientation detection or signal quality improvement, in accordance with at least one embodiment of the present disclosure. A guidewire 350 includes an electronic component 112 such as an ultrasound transducer 360. Ultrasound signals 2105 (e.g., Doppler shift signals) are transmitted to block 2110, where the velocity distribution of the blood flow is determined. This may for example include flow vs. time, flow vs. position, velocity-vs-number-of-measurements, or frequency-vs-number-of-measurements. The raw flow information can then be used for feature extraction, such as an algorithm to extract velocity distributions at each of a plurality of points in time, which can then be adapted to interrogate measurement volumes at different depths from the transducer.

The derived flow information 2115 can be used in block 2120 for position/orientation detection of the guidewire (as shown for example in FIGS. 18, 19, and 20), and/or for correction of the flow data that compensates for position or alignment errors (as shown for example in FIGS. 18, 19, and 20) by, for example, adjusting the velocity spectrum. Such compensation may for example rely on pattern matching, lookup tables, deep learning networks or other artificial intelligence, geometric transformations, or other mathematical transformations or compensations.

The derived flow information 2115 can also be used in block 2130 as input to clinical algorithms to, for example, determine cardiac flow reserve (CFR) or other physiological parameters, whether based on uncorrected data, or on corrected data as described above.

The signal quality or position/orientation information can then be used by block 2150 for on-screen guidance to the clinician (as shown for example in FIGS. 14-18) on a screen display 2140. The screen display 1540 may also display clinical data such as velocity distributions or spectra, CFR calculations, or other information related to blood flow within the vessel.

Such devices, systems, and methods may incorporate a significant amount of data, including for example both good and bad quality data in equal or unequal amounts, whether annotated or otherwise. Some pre-processing can be done (e.g., in block 2120) to extract relevant information/features, e.g. deriving the velocity profile at different volume segments. Based on this extracted data, numerous appropriate algorithms can be developed (e.g., a classical algorithm such as an algebraic or geometric transformation) or trained (e.g., a deep learning or other artificial intelligence algorithm) that work to provide user guidance or help to determine the CFR. Inference of the algorithm can be implemented in firmware/software on a console personal computer, such as for example Compute Unified Device Architecture (CUDA) code running on a graphical processing unit (GPU).

The presence of such algorithms in a given system, device, or method may be demonstrated by visual inspection of how the user is guided during manipulating the guidewire to find its optimum position or orientation. Another indication may occur when the system suggests for the clinician to move (e.g., semi-randomly) the guidewire around for some time after which a result becomes available.

Figure 22:
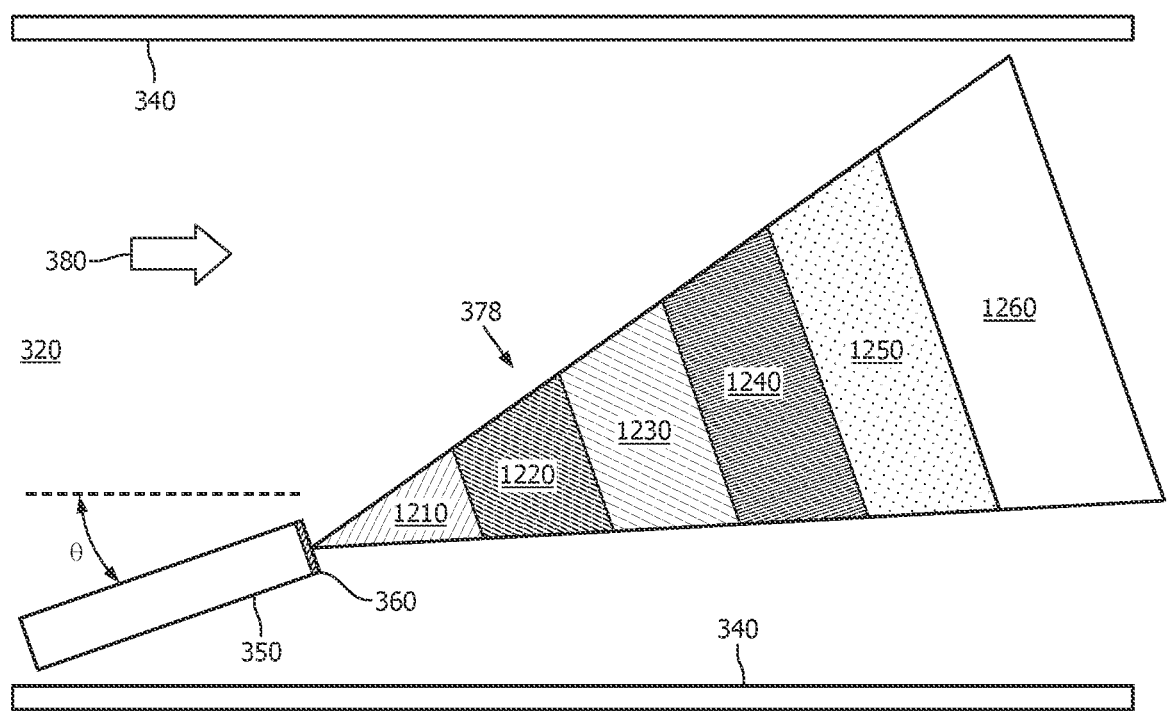
FIG. 22 is a schematic, diagrammatic example of interrogating flow variables using sample volumes at different depths from the ultrasound transducer, in accordance with at least one embodiment of the present disclosure.

FIG. 22 is a schematic, diagrammatic example of interrogating flow variables using sample volumes at different depths from the ultrasound transducer 360, in accordance with at least one embodiment of the present disclosure. In the example shown in FIG. 22, a single transducer element 360 of a guidewire 350 measures flow information at different depths. A processor can then apply (classical or AI-based) signal processing algorithms to derive signal quality and/or position and orientation information. The fact that clinicians use an audio signal derived from the demodulated flow signal already indicates that latent information is present that is not easily accessible for the less experienced user.

A particular method to extract position and/or orientation information from the signal is to determine the flow velocity profiles for different volumes at different distances from the guidewire tip. One possible example of the use of flow signals at different distances to get an improved result is already published in P. A. Kaufmann et al. J. Nucl. Med. 2005; 46: 1272-1277. It is noted in the present disclosure that as the orientation of the guidewire changes with respect to the blood flow, the region with lower velocity close to the tip of the guidewire will change shape. Furthermore, when part of the beam penetrates the vessel wall and surrounding tissue, the velocity profile of the corresponding volume segment will change dramatically.

In the example of FIG. 22, the viewing cone 378 includes a region 1210 that is too close to the transducer 360 for accurate flow measurements, and a region 1260 that is too far from the transducer for accurate flow measurements. The viewing cone 378 also include a first sample volume 1220 (e.g., Volume 1), a second sample volume 1230 (e.g., Volume 2), a third sample volume 1240 (e.g., Volume 3), and a fourth sample volume 1250 (e.g., Volume 4). The magnitude and quality of flow measurements can be affected by distance from the transducer 360, such that comparing the flow in Volume 1, Volume 2, Volume 3, and Volume 4 can provide evidence (a) that none of these volumes intersects the vessel walls 340, (b) that the transducer 360 is closer to one vessel wall 340 than to the opposite vessel wall 340 (e.g., the transducer is not centered in the vessel 320), and (c) that the viewing cone 378 is not parallel to the direction of blood flow 380, but rather oriented to it at an angle of θ. Such information can be used for user guidance or measurement corrections, as described above.

Figure 23:
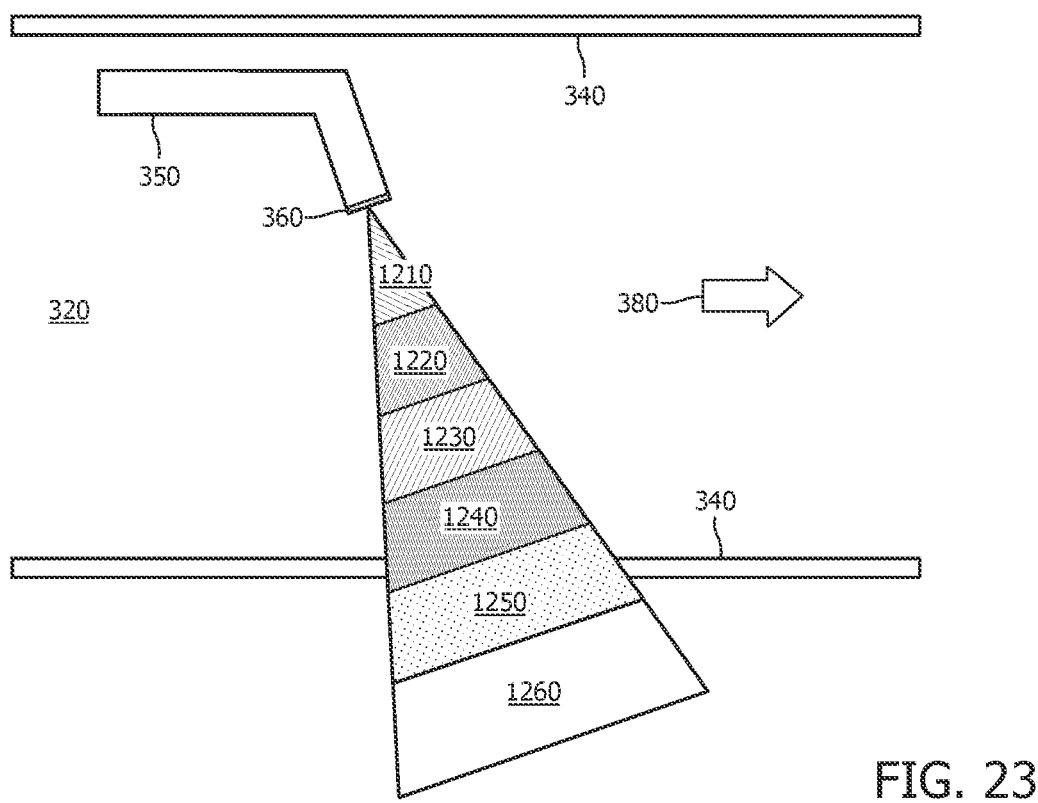
FIG. 23 is a is a schematic, diagrammatic example of interrogating flow variables using sample volumes at different depths from the ultrasound transducer, in accordance with at least one embodiment of the present disclosure.

FIG. 23 is a is a schematic, diagrammatic example of interrogating flow variables using sample volumes at different depths from the ultrasound transducer 360, in accordance with at least one embodiment of the present disclosure. As described above, another method is to identify wall angle reflections and analyze how the wall reflection spreads out as a function of the distance to the guidewire, as shown for example in FIGS. 18A-18C. In the example of FIG. 23, the viewing cone 378 includes a region 1210 that is too close to the transducer 360 for accurate flow measurements, and a region 1260 that is too far from the transducer for accurate flow measurements. The viewing cone 378 also include a first sample volume 1220 (e.g., Volume 1), a second sample volume 1230 (e.g., Volume 2), a third sample volume 1240 (e.g., Volume 3), and a fourth sample volume 1250 (e.g., Volume 4). The magnitude and quality of flow measurements can be affected by distance from the transducer 360, such that comparing the flow in Volume 1, Volume 2, Volume 3, and Volume 4 can provide evidence (a) that volume 4 exists mostly within and beyond the vessel wall 340, (b) that Volume 3 partially intersects the vessel wall 340, (b) that the transducer 360 is closer to one vessel wall 340 than to the opposite vessel wall 340 (e.g., the transducer is not centered in the vessel 320), and (c) that the viewing cone 378 is not parallel to the direction of blood flow 380. Such information can be used for user guidance or measurement corrections, as described above.

In some embodiments, sensor signals other than Doppler-shifted echoes may be used instead of or in addition to Doppler-shifted echoes to measure velocities within a blood vessel. In some embodiments, the velocity measurements may be stored, displayed, or operated on in forms other than a velocity spectrum. In some embodiments, sensor signals other than velocity measurements may be used to carry out at least some of the steps described herein (e.g., pressure signals, volume signals, flowrate signals, or otherwise). In some embodiments, the system may perform one or more steps automatically, without input from a user and without output to a display. In some embodiments, guidance may be provided to the user without the need for a display, e.g., through tactile feedback auditory feedback that is different from a standard Doppler chirp, through indicator lights, through analog indicators such as dials, or otherwise.

Figure 24:
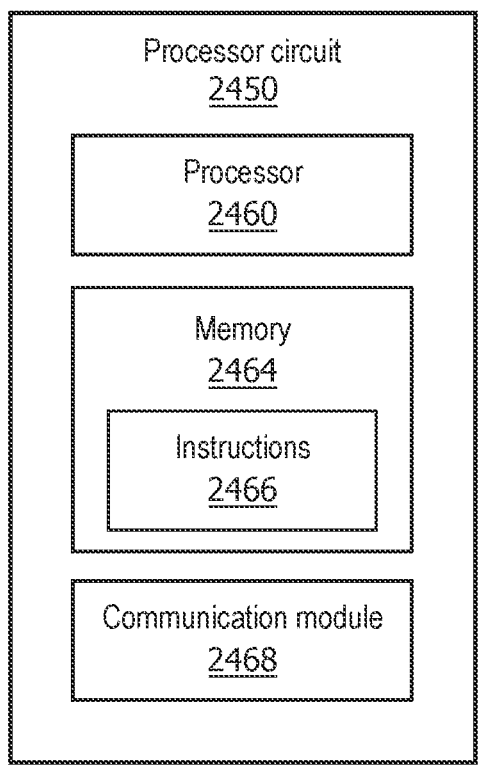
FIG. 24 is a schematic diagram of a processor circuit, in accordance with at least one embodiment of the present disclosure.

FIG. 24 is a schematic diagram of a processor circuit 2450, according to at least one embodiment of the present disclosure. The processor circuit 2450 may be implemented in the intravascular sensing system 100, processing system 306, or other devices or workstations (e.g., third-party workstations, network routers, etc.), or on a cloud processor or other remote processing unit, as necessary to implement the devices, systems, and methods disclosed herein. As shown, the processor circuit 2450 may include a processor 2460, a memory 2464, and a communication module 2468. These elements may be in direct or indirect communication with each other, for example via one or more buses.

The processor 2460 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. The processor 2460 may also comprise another hardware device, a firmware device, or any combination thereof configured to perform the operations described herein. The processor 2460 may also be implemented as a combination of computing devices, e.g., a combination of a DSP and a microprocessor, a plurality of microprocessors, one or more microprocessors in conjunction with a DSP core, or any other such configuration.

The memory 2464 may include a cache memory (e.g., a cache memory of the processor 2460), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 2464 includes a non-transitory computer-readable medium. The memory 2464 may store instructions 2466. The instructions 2466 may include instructions that, when executed by the processor 2460, cause the processor 2460 to perform the operations described herein. Instructions 2466 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The communication module 2468 can include any electronic circuitry and/or logic circuitry to facilitate direct or indirect communication of data between the processor circuit 2450, and other processors or devices. In that regard, the communication module 2468 can be an input/output (I/O) device. In some instances, the communication module 2468 facilitates direct or indirect communication between various elements of the processor circuit 2450 and/or the intravascular measurement system 100. The communication module 2468 may communicate within the processor circuit 2450 through numerous methods or protocols. Serial communication protocols may include but are not limited to US SPI, I²C, RS-232, RS-485, CAN, Ethernet, ARINC 429, MOD-BUS, MIL-STD-1553, or any other suitable method or protocol. Parallel protocols include but are not limited to ISA, ATA, SCSI, PCI, IEEE-488, IEEE-1284, and other suitable protocols. Where appropriate, serial and parallel communications may be bridged by a UART, USART, or other appropriate subsystem.

External communication (including but not limited to software updates, firmware updates, preset sharing between the processor and central server, or readings from the ultrasound device) may be accomplished using any suitable wireless or wired communication technology, such as a cable interface such as a USB, micro USB, Lightning, or FireWire interface, Bluetooth, Wi-Fi, ZigBee, Li-Fi, or cellular data connections such as 2G/GSM, 3G/UMTS, 4G/LTE/WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information.

Information may also be transferred on physical media such as a USB flash drive or memory stick.

Accordingly, it can be seen that the present disclosure improves the operation of flow-sensing guidewire devices and systems, by permitting the user to understand positioning or alignment problems within a vessel and/or correcting for such problems to construct valid flow measurement data.

The present disclosure may for example be applied for the Philips IGT-D™ business for the existing flow modality, or the Philips Combowire™ that provides simultaneous pressure and flow information. It can also be applied to new flow modalities under the development, both for existing devices and for devices hereinafter developed, either with single transducers or multiple transducers as described above, and comprising either a flow-only sensor or a flow sensor combined with a pressure sensor, or with other sensing modalities. In some embodiments, as part of this development, new patient interface modules (PIMs) may developed that can facilitate the capture of the full raw data signal coming from the flow transducer, to provide raw data for the methods, devices, and systems described herein.

A number of variations are possible on the examples and embodiments described above. For example, a flow measurement system may be characterized in the fact that it provides a clear guidance to the user on transducer positioning and orientation (on screen, via audio/speech, tactile feedback or any other feedback mechanism to the user). Alternatively, some examples may include a flow measurement system where the guidance is done visually via an on-screen bull's eye spirit level. Other flow measurement systems may be characterized in the fact that they autonomously select and present the optimal signal from a sequence of flow signals at various transducer positions and orientations. Some implementations may use a single transducer in combination with an intelligent signal processing algorithm to derive signal quality and/or transducer position and orientation information. In some cases, the intelligent signal processing algorithm is a trained artificial intelligent (AI) network. An AI network may be fed with extracted velocity profiles from different tissue/blood volumes at different distances from the guidewire. The flow measurement system may use a single transducer whereby the shear ultrasound wave (transverse wave) is used to derive orthogonal flow velocity information. Alternatively or in addition, the system may employ multiple transducer elements to derive transducer position and orientation information by processing the signals coming from each of the transducer elements. Relative sizes of components may be different than shown herein.

The logical operations making up the embodiments of the technology described herein are referred to variously as operations, steps, objects, elements, components, or modules. Furthermore, it should be understood that these may be arranged or performed in any order, unless explicitly claimed otherwise or a specific order is inherently necessitated by the claim language. It should further be understood that the described technology may be employed in single-use and multi-use electrical and electronic devices for medical or nonmedical use.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the reinforced multi-filar conductor bundle. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." The word "comprising" does not exclude other elements or steps, and the indefinite article "a" or "an" does not exclude a plurality. Unless otherwise noted in the claims, stated values shall be interpreted as illustrative only and shall not be taken to be limiting.

The above specification, examples and data provide a complete description of the structure and use of exemplary embodiments of the flow measurement system as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. An intraluminal sensing system comprising:
  an intraluminal device comprising:
    a flexible elongate member configured to be positioned in a longitudinal direction within a body lumen of a patient; and
    an ultrasound sensor disposed at a distal portion of the flexible elongate member and configured to emit an ultrasound pulse in substantially the longitudinal direction while positioned within the body lumen and to receive Doppler-shifted echoes from the ultrasound pulse; and
  a processor circuit in communication with the ultrasound sensor and configured to:
    compute a velocity spectrum of particles moving within the body lumen based on the received Doppler-shifted echoes;
    identify features in the velocity spectrum indicative of an angular alignment of the ultrasound sensor within the body lumen; and
    output, to a display in communication with the processor circuit, positioning guidance for the intraluminal device based on the identified features in the velocity spectrum, wherein the positioning guidance comprises:
      an indicator defining a closed, concentric boundary; and
      a guidance marker movable in two dimensions within the closed, concentric boundary, wherein a location of the guidance marker relative to the indicator is representative of the angular alignment.

2. The intraluminal sensing system of claim 1, wherein the processor circuit is further configured to determine whether the angular alignment falls within a pre-determined range indicative of a signal quality of the received Doppler-shifted echoes.

3. The intraluminal sensing system of claim 2, wherein the processor circuit is further configured to, based on whether the angular alignment falls within the pre-determined range:
   determine whether to calculate a flow parameter from the velocity spectrum; and
   calculate the flow parameter from the velocity spectrum.

4. The intraluminal sensing system of claim 3, wherein the processor circuit is further configured to, based on second Doppler echoes received from a second ultrasound pulse emitted by ultrasound sensor:
   compute a second velocity spectrum of particles moving within the body lumen; and
   identify features in the second velocity spectrum indicative of a second angular alignment of the ultrasound sensor within the body lumen; and
   based on a comparison between the angular alignment and the second angular alignment, determine whether to recalculate the flow parameter from the second velocity spectrum.

5. The intraluminal sensing system of claim 2, wherein the processor circuit is further configured to, based on whether the angular alignment falls within the pre-determined range, issue instructions to a user or operator of the intraluminal sensing system to alter the angular alignment.

6. The intraluminal sensing system of claim 5, wherein the instructions comprise text or graphics.

7. The intraluminal sensing system of claim 1, wherein identifying the features in the velocity spectrum comprises pattern matching, lookup tables, a learning network, or a geometric transformation.

8. The intraluminal sensing system of claim 1, wherein the processor circuit is further configured to adjust the velocity spectrum based on the identified features in the velocity spectrum.

9. The intraluminal sensing system of claim 8, wherein the adjusting includes pattern matching, lookup tables, a learning network, or a geometric transformation.

10. The intraluminal sensing system of claim 1,
    wherein the ultrasound sensor is further configured to emit an ultrasound shear wave in a direction substantially perpendicular to the longitudinal direction while positioned within the body lumen and to receive second Doppler-shifted echoes from the shear wave; and
    wherein the processor circuit is further configured to compute the velocity spectrum based on the Doppler-shifted echoes and the second Doppler-shifted echoes.

11. The intraluminal sensing system of claim 1,
    further comprising a second ultrasound sensor disposed at the distal portion of the flexible elongate member and configured to emit a second ultrasound pulse substantially orthogonal to the longitudinal direction and to receive second Doppler-shifted echoes from the second ultrasound pulse,
    wherein the processor circuit is further configured to compute the velocity spectrum based on the Doppler-shifted echoes and the second Doppler-shifted echoes.

12. The intraluminal sensing system of claim 1, wherein the processor circuit is further configured to:
    based on the received Doppler-shifted echoes, compute a first velocity spectrum at a first measurement depth;
    based on the received Doppler-shifted echoes, compute a second velocity spectrum at a second measuring depth; and
    identify features in the first velocity spectrum and the second velocity spectrum indicative of a second angular alignment of the ultrasound sensor within the body lumen.

13. The intraluminal sensing system of claim 1, wherein the indicator and the guidance marker form a bull's eye spirit level.

14. The intraluminal sensing system of claim 1, wherein the features in the velocity spectrum are further indicative of a lateral position of the ultrasound sensor within the body lumen.

15. The intraluminal sensing system of claim 1, wherein the intraluminal device further comprises a rotary encoder configured to provide a rotational orientation of the intraluminal device.

16. A method for intraluminal sensing comprising:
    an intraluminal sensing system comprising an ultrasound sensor disposed at a distal portion of a flexible elongate member positioned within a body lumen of a patient:
      emitting an ultrasound pulse in a substantially longitudinal direction; and
      receiving Doppler-shifted echoes from the ultrasound pulse; and
    with a processor circuit in communication with the ultrasound sensor:
      computing a velocity spectrum of particles moving within the body lumen, based on the received Doppler-shifted echoes; and
      identifying features in the velocity spectrum indicative of an angular alignment of the ultrasound sensor within the body lumen; and
      outputting, to a display in communication with the processor circuit, positioning guidance for the ultrasound sensor based on the identified features in the velocity spectrum, wherein the positioning guidance comprises:
        an indicator defining a closed, concentric boundary; and
        a guidance marker movable in two dimensions within the closed, concentric boundary, wherein a location of the guidance marker relative to the indicator is representative of the angular alignment.

17. The method of claim 16, further comprising, with the processor circuit:
    determining whether the angular alignment falls within a pre-determined range indicative of a signal quality of the received Doppler-shifted echoes;
    based on whether the angular alignment falls within the pre-determined range, calculating a flow parameter from the velocity spectrum; and
    based on whether the angular alignment falls within the pre-determined range, issuing instructions to a user or operator of the intraluminal sensing system to alter the angular alignment.

18. The method of claim 17, further comprising, with the processor circuit:
    based on second Doppler echoes received from a second ultrasound pulse emitted by the ultrasound sensor:
      computing a second velocity spectrum of particles moving within the body lumen; and
      identifying features in the second velocity spectrum indicative of a second angular alignment of the ultrasound sensor within the body lumen;
    based on the identified features in the second velocity spectrum, determining whether the second angular alignment falls within a pre-determined range indicative of a signal quality of the second received Doppler-shifted echoes;
    based on whether the second angular alignment falls within the pre-determined range of the second echoes, determining whether to calculate the flow parameter from the second velocity spectrum;

based on whether the second angular alignment falls within the pre-determined range of the second echoes, issuing instructions to the user or operator of the intraluminal sensing system to alter the second angular alignment; and calculating the flow parameter from the second velocity spectrum.

19. The method of claim 16, further comprising adjusting the velocity spectrum based on the identified features in the velocity spectrum.

20. The method of claim 16, further comprising:
with the ultrasound sensor, emitting an ultrasound shear wave in a direction substantially perpendicular to the longitudinal direction while positioned within the body lumen and to receive second Doppler-shifted echoes from the shear wave; and
computing the velocity spectrum based on the Doppler-shifted echoes and the second Doppler-shifted echoes.

21. The method of claim 16, further comprising:
with a second ultrasound sensor disposed at the distal portion of the flexible elongate member:
emitting a second ultrasound pulse substantially orthogonal to the longitudinal direction;
receiving second Doppler-shifted echoes from the second ultrasound pulse; and
with the processor circuit, computing the velocity spectrum based on the Doppler-shifted echoes and the second Doppler-shifted echoes.

22. The method of claim 16, further comprising, with the processor circuit:
based on the received Doppler-shifted echoes, computing a first velocity spectrum at a first measurement depth;
based on the received Doppler-shifted echoes, computing a second velocity spectrum at a second measuring depth; and identifying features in the first velocity spectrum and the second velocity spectrum indicative of a second angular alignment of the ultrasound sensor within the body lumen.

23. An intravascular sensing system comprising:
a sensing guidewire comprising:
a flexible elongate member configured to be positioned along a longitudinal direction within a blood vessel of a patient;
an intravascular ultrasound sensor disposed at a distal portion of the flexible elongate member and configured to emit an ultrasound pulse in substantially the longitudinal direction while positioned within the blood vessel and to receive Doppler-shifted echoes from the ultrasound pulse; and
a processor circuit in communication with the intravascular ultrasound sensor and configured to:
based on the received Doppler-shifted echoes, compute a velocity spectrum of particles moving within the blood vessel;
identify features in the velocity spectrum indicative of an angular alignment of the intravascular ultrasound sensor within the blood vessel; and
output, to a display in communication with the processor circuit, positioning guidance for the intravascular ultrasound sensor based on the identified features in the velocity spectrum, wherein the positioning guidance comprises:
an indicator defining a closed, concentric boundary; and
a guidance marker movable in two dimensions within the closed, concentric boundary, wherein a location of the guidance marker relative to the indicator is representative of the angular alignment.

* * * * *